(12) United States Patent
Marshall et al.

(10) Patent No.: US 7,381,150 B2
(45) Date of Patent: Jun. 3, 2008

(54) HYDRAULIC REGENERATIVE DRIVE SYSTEM AND CONTROLS

(75) Inventors: Christopher Scott Marshall, Alstonville (AU); Bradley James Cooke, Richmond Hill (AU); Michael James Kearsey, Mannering Park (AU)

(73) Assignee: Permo-Drive Research & Development Pty. Ltd., Ballina, New South Wales (AU)

(*) Notice: Subject to any disclaimer, the term of this patent is extended or adjusted under 35 U.S.C. 154(b) by 264 days.

(21) Appl. No.: 11/208,048

(22) Filed: Aug. 18, 2005

(65) Prior Publication Data

US 2006/0079375 A1    Apr. 13, 2006

Related U.S. Application Data

(60) Provisional application No. 60/612,047, filed on Sep. 21, 2004.

(30) Foreign Application Priority Data

Aug. 18, 2004    (AU) .............................. 2004904705

(51) Int. Cl.
 *B60W 10/04* (2006.01)
(52) U.S. Cl. ......................................... 477/115; 477/52
(58) Field of Classification Search .................... None
 See application file for complete search history.

(56) References Cited

U.S. PATENT DOCUMENTS

| | | | |
|---|---|---|---|
| 4,372,414 A | 2/1983 | Anderson et al. | |
| 4,382,484 A | 5/1983 | Anderson et al. | |
| 4,531,431 A | 7/1985 | Dreher et al. | |
| 5,024,489 A | 6/1991 | Tanaka et al. | |
| 5,088,041 A * | 2/1992 | Tanaka et al. | 701/70 |
| 5,117,632 A | 6/1992 | Strenzke | |
| 5,193,416 A | 3/1993 | Kanayama | |
| 5,495,912 A | 3/1996 | Gray, Jr. et al. | |
| 5,540,051 A | 7/1996 | Maruyama et al. | |
| 5,622,050 A | 4/1997 | Ishino et al. | |
| 5,806,617 A | 9/1998 | Yamaguchi | |
| 5,915,362 A | 6/1999 | Fuwa et al. | |
| 6,166,517 A | 12/2000 | Wakashiro et al. | |
| 6,170,587 B1 | 1/2001 | Bullock | |
| 6,712,166 B2 | 3/2004 | Rush et al. | |

* cited by examiner

*Primary Examiner*—Roger Pang
*Assistant Examiner*—Derek D. Knight
(74) *Attorney, Agent, or Firm*—Merchant & Gould P.C.

(57) ABSTRACT

The hydraulic regenerative drive system for a vehicle includes an electronic controller, a hydraulic control circuit that receives control signals from the electronic controller, a reservoir in fluid communication with the hydraulic control circuit, a pump/motor unit having a controlled-angle swash plate element providing variable displacement, an accumulator in fluid communication with the hydraulic control circuit and a pump/motor unit speed sensor and pump/motor unit pressure sensor providing measured speed and measured pressure signals to the electronic controller. The electronic controller generates a torque signal and a modified engine throttle signal on the basis of a mathematical model, converts the torque signal to a swash plate angle, and controls a controlled-torque retard mode of operation and a controlled torque propulsion mode of operation. The electronic controller also performs a conversion between the torque signal and swash plate angle on the basis of searching predetermined characteristics of torque versus pressure versus speed.

4 Claims, 45 Drawing Sheets

US 7,381,150 B2

HYDRAULIC REGENERATIVE DRIVE SYSTEM AND CONTROLS

FIELD OF THE INVENTION

This invention relates to the field of hydraulic regenerative drive systems for vehicles. It relates also the controls for such systems.

BACKGROUND

Regenerative drive systems act in a first manner to retard a vehicle such that motive energy is extracted from the vehicle's drive train and provides rotary (kinetic) energy to a pump/motor unit, which pumps a fluid from a reservoir to a higher pressure accumulator. Such drive systems also act to propel a vehicle by the reverse process, in which the stored (potential) energy of the fluid is released from the accumulator and drives the pump/motor unit to impart energy to the drive train. Two examples of such a system are described in U.S. Pat. No. 4,986,383 to Evans, issued on Jan. 22, 1991, and in U.S. Pat. No. 5,024,489 to Tanaka et al, issued on Jun. 18, 1991.

Regenerative drive systems have demonstrated the ability to cut fuel consumption in vehicles by 10-25%, although this is strongly dependent upon drive cycle and vehicle type (especially weight). There remains considerable interest in further improving such performance, either in the mechanical and hydraulic components themselves, or in control systems for the circuits constituted by these components.

SUMMARY

In general terms, there is disclosed a hydraulic regenerative drive system for a vehicle including an electronic controller receiving a nominal engine throttle signal and generating a time-variant torque signal therefrom. The controller controls (i) a controlled-torque retard mode of operation, in which a dynamically calculated retarding torque is imparted to the drive train of said vehicle, and (ii) a controlled-torque propulsion mode of operation, in which a dynamically calculated propelling torque is imparted to said drive train.

There is further disclosed a hydraulic regenerative drive system for a vehicle comprising:
  an electronic controller receiving a nominal engine throttle signal, generating a time-variant torque signal therefrom;
  a hydraulic control circuit receiving controlling signals from the electronic controller;
  a reservoir in fluid communication with said hydraulic control circuit for storing hydraulic fluid;
  a pump/motor unit having a controlled element providing variable displacement, said pump/motor unit being in fluid communication with said hydraulic control circuit and adapted for connection to the drive train of a vehicle; and
  an accumulator in fluid communication with said hydraulic control circuit;
  and wherein said controller controls (i) a controlled-torque retard mode of operation, in which said controlled element is controlled by said torque signal to impart a dynamically calculated retarding torque to said drive train, and said pump/motor unit pumps fluid from said reservoir to said accumulator via said hydraulic control circuit, and (ii) a controlled-torque propulsion mode of operation, in which said controlled element is controlled by said torque signal to impart a dynamically calculated propelling torque to said drive train, and said pump/motor unit motors under influence of fluid from said accumulator passing to said reservoir via said hydraulic control circuit.

There is yet further disclosed an electronic controller for a hydraulic regenerative drive system, said controller receiving a nominal engine throttle signal, generating a time-variant torque signal therefrom, and wherein said controller controls (i) a controlled-torque retard mode of operation of said drive system, in which a controlled element of a pump/motor unit is controlled by said torque signal to impart a dynamically calculated retarding torque to a vehicle drive shaft; and (ii) a controlled-torque propulsion mode of operation, in which said pump/motor unit is controlled by said torque signal to impart a dynamically calculated propelling torque to said drive shaft.

There is yet further disclosed a method for controlling operation of a hydraulic regenerative drive system comprising the steps of:
  generating a time-variant torque signal from a nominal engine throttle signal; and
  instructing either (i) a controlled-torque retard mode of operation, in which a controlled element of a pump/motor unit is controlled by said torque signal to impart a dynamically calculated retarding torque to a vehicle drive shaft, or (ii) a controlled-torque propulsion mode of operation, in which said controlled element is controlled by said torque signal to impart a dynamically calculated propelling torque to said drive shaft.

Preferably, the electronic controller or a further method step outputs a modified engine throttle signal, and said torque signal and the vehicle's engine torque corresponding to the modified throttle signal are equal to the torque corresponding to the nominal engine throttle signal.

There additionally is disclosed a computer program product comprising a computer program stored on a storage medium, the program including code means for performing the method steps given above Other aspects of the system, controller and method are disclosed in the claims.

DETAILED DESCRIPTION

Overview

Figure 1:
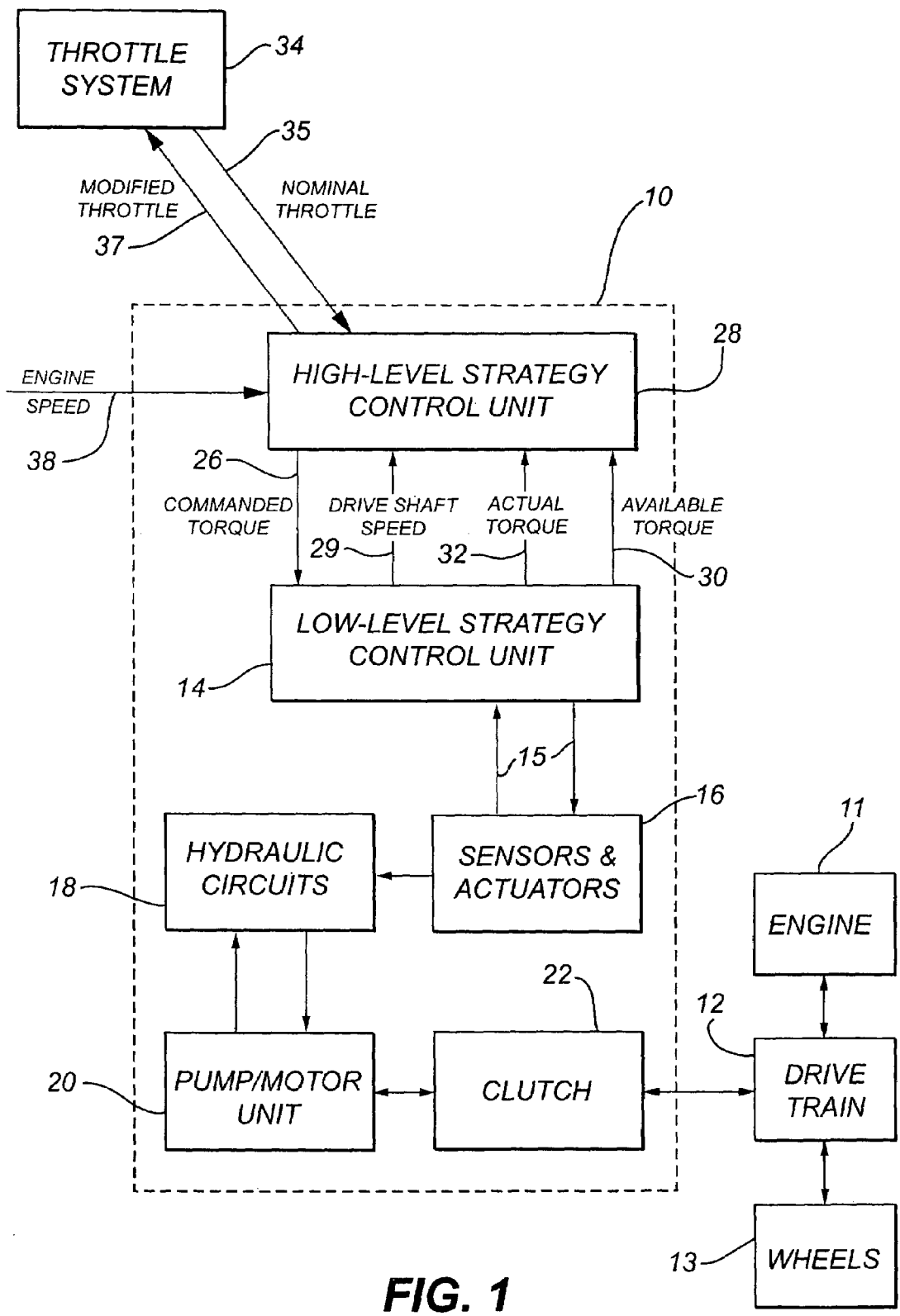
FIG. 1 is a schematic block diagram of a Regenerative Drive System (RDS) and interfaces with vehicle management systems.

FIG. 1 shows a schematic representation of a RDS 10 having connection with the drive train 12 of a vehicle. The drive train 12 also connects the vehicle's engine 11 with the vehicle's driving wheels 13. The RDS 10 has a low-level strategy control unit 14, embodied in a programmed microprocessor. The low-level strategy control unit 14 interfaces, by various b-directional signals 15 with various sensors and actuators 16 associated with a hydraulic circuit 18, a pump motor unit 20 and a clutch 22. The cooperative function of the low-level strategy control 14, the hydraulic circuits 16 and the sensors and actuators 18 is to provide, in the most general sense, torque-controlled retard and propulsion modes of operation. In the 'Retard' mode, energy is drawn-off the drive train 12 by the pump/motor unit 20 to give a braking effect, and stored. In the 'Propulsion' mode, stored energy is imparted to the drive train 12 by the pump/motor unit 20 to supplement or replace vehicle engine motive force. Other modes/states of operation are also supported (as will be described), including 'Standby' and 'Disengaged' (i.e. unclutched).

The low-level control unit 14 is concerned with the control of retarding or propelling torque, and in that sense is provided with a time-variant torque value 26 ('commanded torque') provided by a high-level strategy control unit 28. The high-level control unit 28 also receives drive shaft speed signal 29, an 'available torque' signal 30, and an 'actual torque' value 32 from the low-level strategy control unit 14. The high-level control unit 28 also receives an engine speed signal 38, and interfaces with the vehicle's throttle system 34.

FIGS. 2-5 show details of the sensors and actuators 16, the hydraulic circuits 18, the pump/motor unit 20, and the clutch 22, with reference to various states of operation. The low- and high-level strategy control units 14, 28 are embodied in an Electronic Control Unit (ECU) 90, as will be described.

Figure 2:
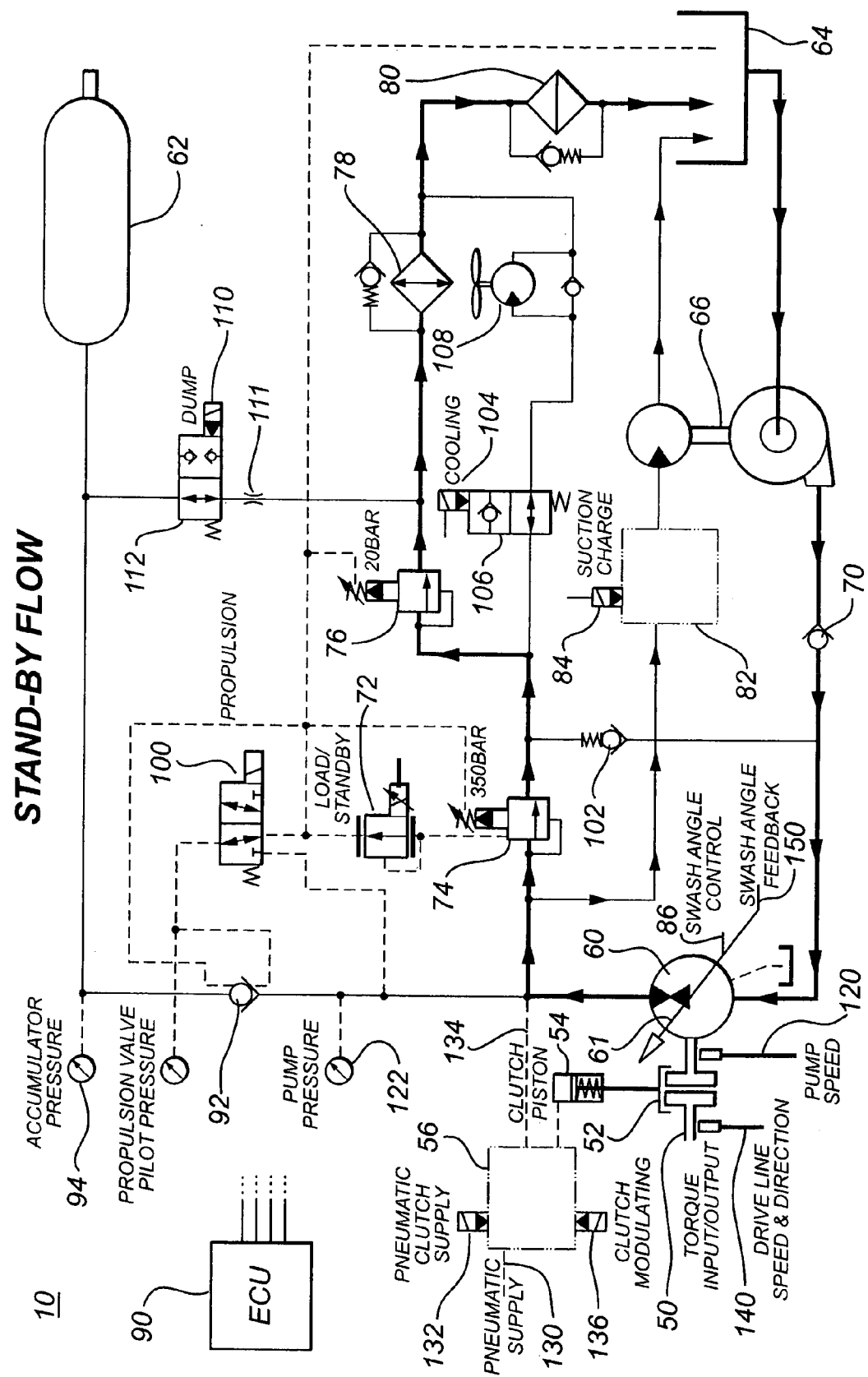
FIG. 2 is a schematic block diagram of the RDS of FIG. 1 in a stand-by mode of operation.

Beginning with FIG. 2, a torque input/input (take-off) point 50 (also referred to as the 'drive shaft') represents the drive train 12 of the vehicle shown in FIG. 1. A mechanical clutch 52 is controlled by a clutch piston 54 and, in turn, by a clutch actuator 56. The clutch 52 serves to connect a pump/motor unit 60 (i.e. 20 in FIG. 1) to the drive shaft 50. A hydraulic fluid is circulated between an accumulator 62 and a reservoir 64 according to whether the pump/motor unit 60 is motoring to provide torque to the drive shaft 50, or pumping under torque imparted by the drive shaft 50. The specific hydraulic circuits and actuators will be described below with reference to the various modes of operation.

For the purposes of providing an example, consider a vehicle of 16,000 kg mass, a pump/motor unit of capacity 250 cc/rev, a 180 litre accumulator and maximum flow rate of 400 l/min.

The pump/motor unit 60, in the preferred embodiment, is a variable displacement axial piston pump, and in the present example is a Bosch Rexroth model A4VSO. The controlling element of the pump/motor unit 60 is a swash plate 61 which is adjustable in terms of angular displacement to give varying degrees of pumping or motoring action. Negative swash plate angle (−15 to 0 degrees) represents retarding (pumping) operation, whereas positive swash plate angle (i.e. 0 to +15 degrees) represents propulsion (motoring) operation.

Figure 8:
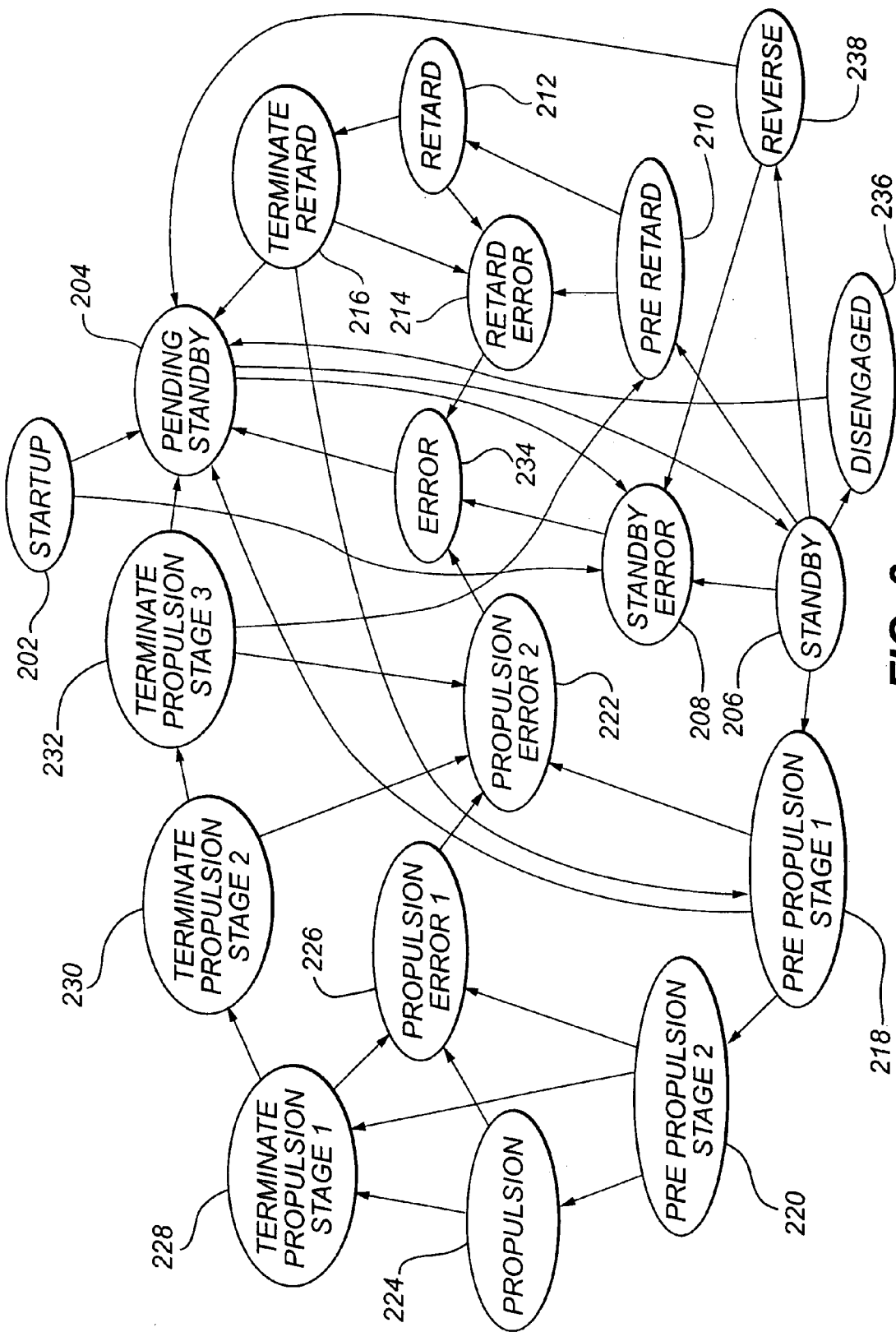
FIG. 8 is a schematic block diagram of a low-level control.

The specific hydraulic circuits arrangements of FIGS. 2-5 should be read in conjunction with the state diagram of FIG. 8. The hydraulic circuits arrangements of FIGS. 2-5 represent steady state conditions, and in the terms of FIG. 8 are the Standby state 206, the Retard state 212 and the Propulsion state 224. FIG. 8 includes many other states additional to these 'stable' states, as will presently be described.

Standby Mode

Returning then to FIG. 2, which represents the hydraulic fluid flow in the Standby mode. In this mode of operation, the pump/motor unit 60 is maintained in a charged state in the sense that it is slightly retarding (i.e. pumping), and thus drawing energy from the drive shaft 50. The purpose of the Standby mode is to ensure there is sufficient hydraulic pressure for the pump/motor unit 60 to permit control of the swash plate 61, and secondarily to provide lubrication and cooling.

At a −2 degrees swash plate angle, the pump/motor unit 60 is acting to slightly retard the drive shaft 50. The hydraulic fluid is drawn from reservoir 64 from a centrifugal pump assembly 66 passing a check valve 70 and then to the pump/motor unit 60. The direction of flow is indicated by the closely-spaced arrowheads. The hydraulic flow rate is approximately 50 litres per minute. The fluid flow is enabled by a load/standby solenoid 72 acting on a relief valve 74, such that when the load solenoid 72 is deactivated there is a 0 bar pressure drop across the relief valve 74. A 20 bar valve 76 induces a pressure drop of that amount, after which the fluid passes a cooling circuit 78 and a filter circuits 80 before returning to the reservoir 64.

The centrifugal pump unit 66 receives approximately 5 litres per minute of fluid and is self-latching by a hydraulic latching circuit 82 under control of a suction (air) charge solenoid 84. The function of the centrifugal pump unit 66 is to maintain suction pressure above a minimum specified value, e.g. 0.8 bar absolute for the example pump/motor unit.

The swash plate angle as set by an actuator 86. The load/standby solenoid 72, the suction (air) charge solenoid 84 and the swash angle control actuator 86 are all electrically connected to the ECU 90 which implements the low-level control strategy, in the sense of sequencing the various solenoids and actuators.

In summary then, the solenoid states for the Standby mode are:

| Solenoid | State |
| --- | --- |
| Standby solenoid (72) | De-energised (OFF) |
| Propulsion solenoid (100) | De-energised (OFF) |
| Dump solenoid (110) | Energised (ON) |
| Air charge solenoid (84) | Energised (ON) |

Retard Mode

Figure 3:
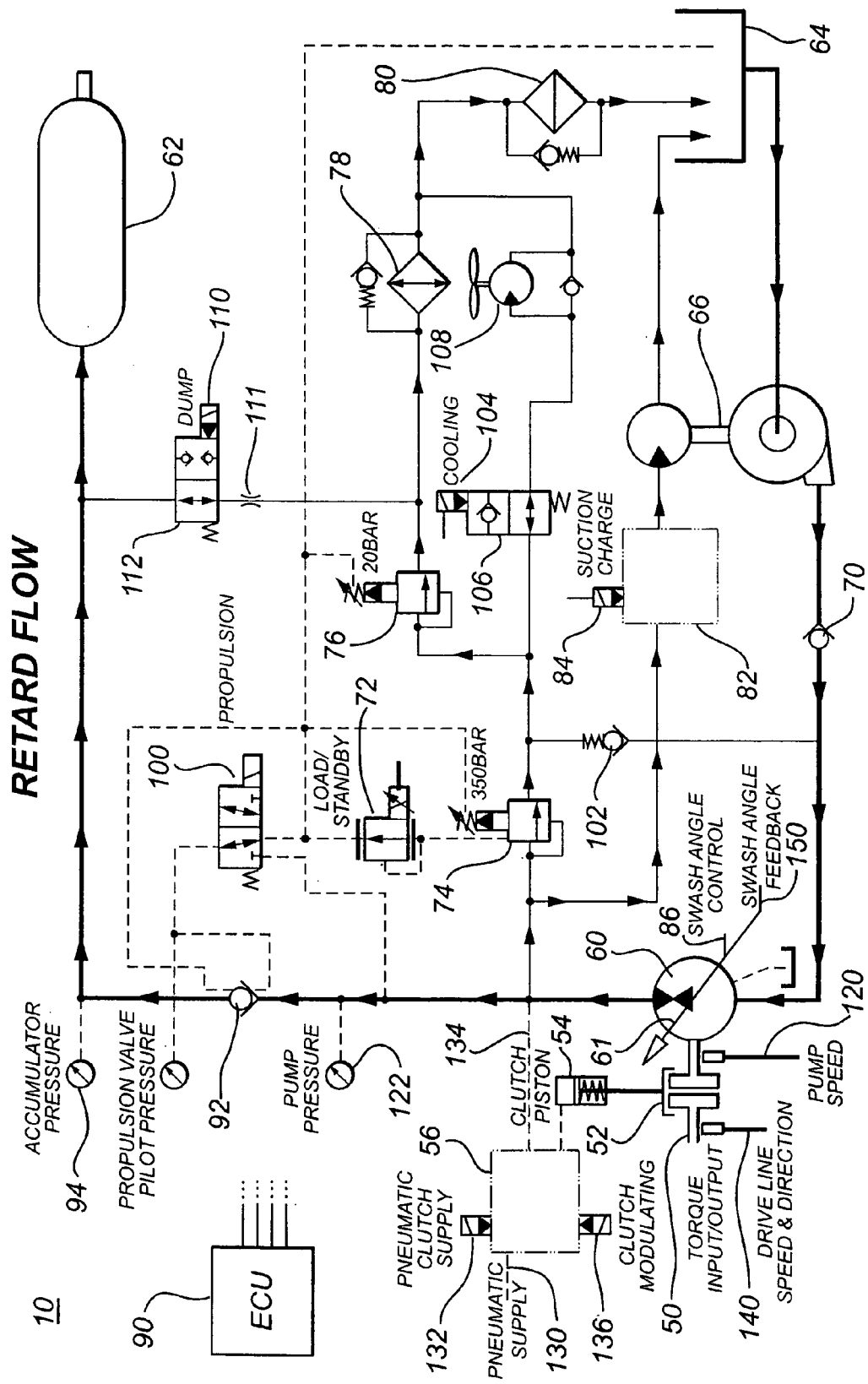
FIG. 3 is a schematic block diagram of the RDS of FIG. 1 in a retard mode of operation.

FIG. 3 shows the Retard mode of operation. In this mode, the pump/motor unit 60 is pumping fluid from the reservoir 64 to the accumulator 62, drawing kinetic energy off the drive shaft 50. The swash plate 61 is set by the actuator 86 to the chosen angular setting (i.e. between −2 and −15 degrees). The fluid flows from the reservoir 64 via the centrifugal pump unit 66 and the check valve 70 through the pump/motor unit 60. The standby solenoid 72, on this occasion, is energized such that the relief valve 74 presents a 350 bar pressure drop. The standby solenoid 72 remains in a state such that the relief valve 74 allows fluid flow with a 350 bar pressure drop, and that fluid flows via the standby valve 76, through the cooler 78 and the filter 80, returning to the reservoir 64.

The main body of fluid proceeds from the pump/motor unit 60 through the check valve 92 and then accumulates in the accumulator 62. This is because the check valve 92 presents only a 5 bar pressure drop, whereas the relief valve 74 presents a 350 bar pressure drop. For the swash plate 61 at a setting of −15 degrees, fluid flow of up to 400 litres per minute will be generated. Accumulator pressure is measured by a pressure sensor 94 and is used to control the swash angle actuator 86 to complete retarding operation when the accumulator 62 is full. If a situation is reached where the accumulator 62 is full and the retarding operation continues, then the fluid will prefer to flow via the relief valve 74, and the 350 bar pressure drop will result in heat being generated.

In summary then, the solenoid states for the Retard mode are:

| Solenoid | State |
| --- | --- |
| Standby solenoid (72) | Energised (ON) |
| Propulsion solenoid (100) | De-energised (OFF) |
| Dump solenoid (110) | Energised (ON) |
| Air charge solenoid (84) | Energised (ON) |

Propulsion Mode

Figure 4:
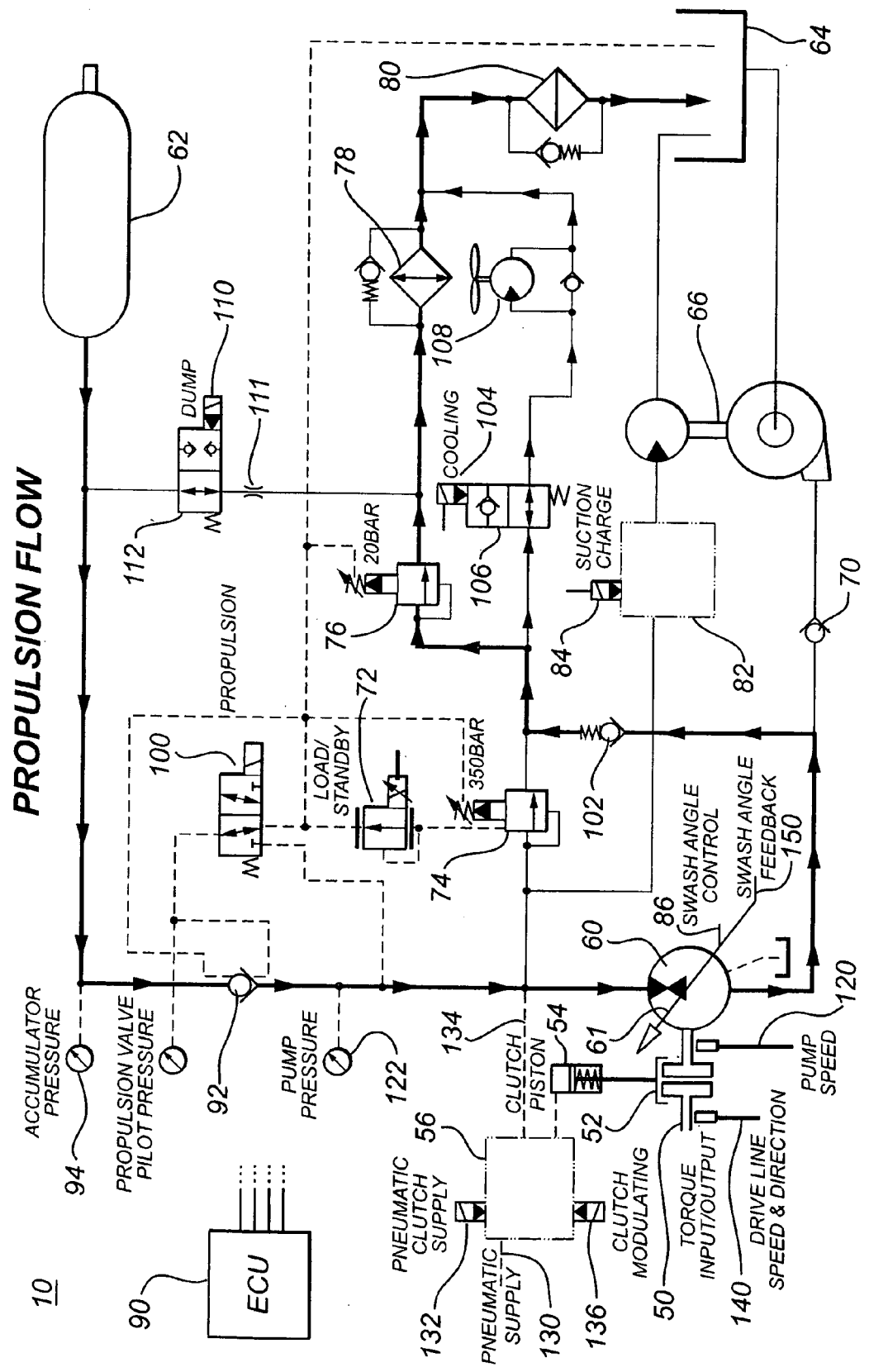
FIG. 4 is a schematic block diagram of the RDS of FIG. 1 in a propulsion mode of operation.

FIG. 4 shows the Propulsion mode of operation, in which accumulated fluid under pressure is used to drive the pump/motor unit 60 to impart kinetic energy to the drive shaft 50.

The propulsion solenoid 100 is energised to allow the fluid in the accumulator 62 to pass the check valve 92. The swash angle control actuator 86 sets a swash plate 61 position in the range 0 to +15 degrees to control the rate of fluid being sourced from the accumulator 62 and thus control the torque applied to the drive shaft 50 by the pump/motor unit 60. The fluid typically will have a flow rate of 400 litres per minute and is blocked by the check valve 70, rather flowing through a further check valve 102 then the standby valve 76, resulting in a 20 bar pressure drop and, again, passing via the cooling circuit 78 and the filter circuit 80 to the reservoir 64. The standby solenoid 72 is in an energized state so that the relief valve 74 presents a 350 bar pressure drop, and is therefore blocking to the flow of fluid from the accumulator 62.

A cooling solenoid 104 causes a valve 106 to open such that pilot fluid flow also proceeds to the coiling fans 108 associated with the cooling circuit 80. The pilot flow typically is of the order of 12 litres per minute.

In summary then, the solenoid states for the Propulsion mode are:

| Solenoid | State |
| --- | --- |
| Standby solenoid (72) | Energised (ON) |
| Propulsion solenoid (100) | Energised (ON) |
| Dump solenoid (110) | Energised (ON) |
| Air charge solenoid (84) | Energised (ON) |

Dump Mode

Figure 5:
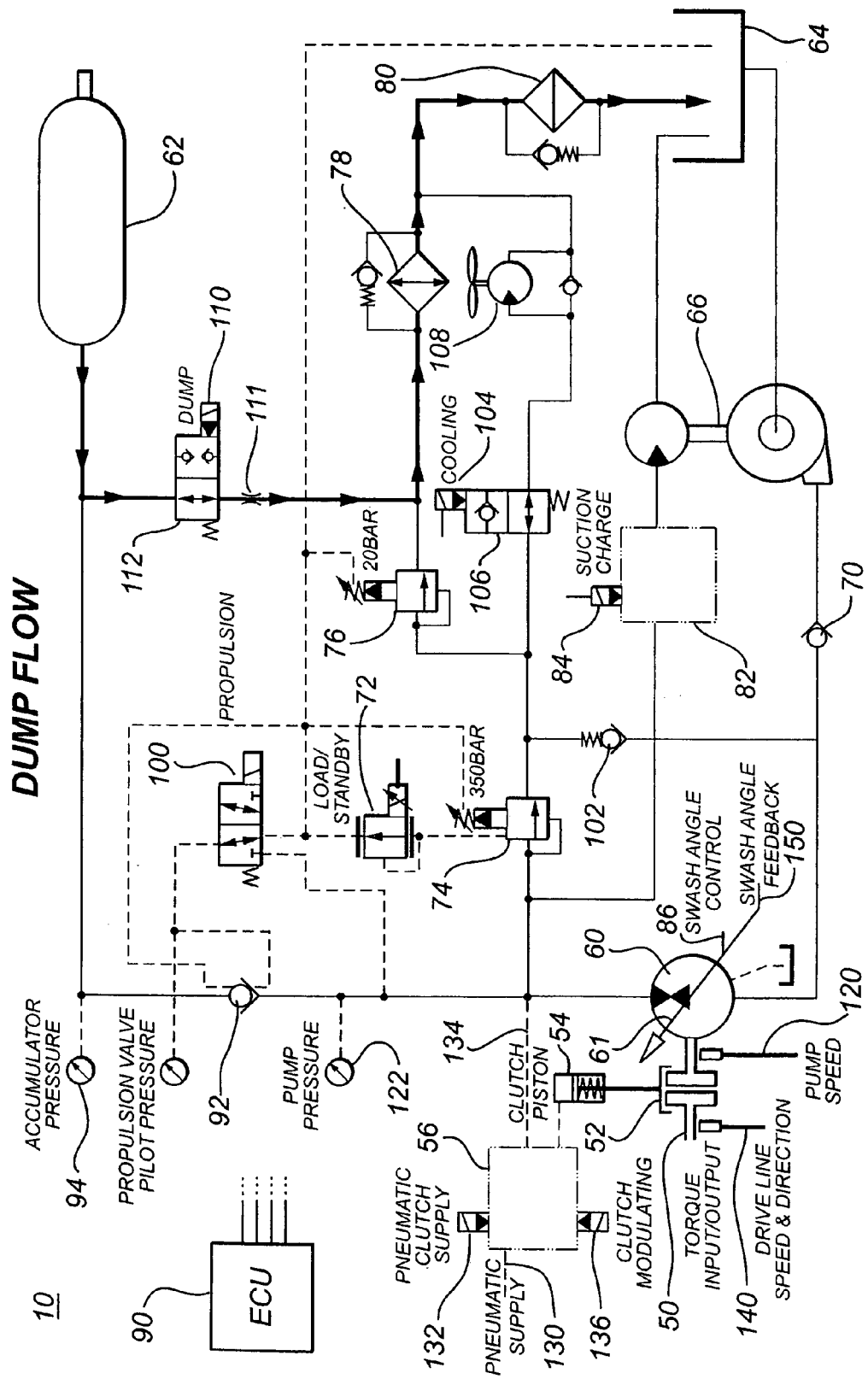
FIG. 5 is a schematic block diagram of the RDS of FIG. 1 in a dump mode of operation.

FIG. 5 shows an arrangement where accumulated fluid in the accumulator 62 is required to be discharged. This may occur in situations where maintenance is required to be done and it would be dangerous to have a pressure of fluid present in the accumulator 62. The path the fluid follows is achieved by a dump solenoid 110 being activated such that the associated valve 112 opens to allow the path of fluid which otherwise is blocked by the check valve 92. The fluid passes through a controlling orifice 111 then via the cooling element 76 and the filter unit 78, returning to the reservoir 64.

Determination of Torque

As indicated in relation to FIG. 1, the high-level strategy control unit 28 determines a commanded torque value 26. This torque value must be converted into a time-variant signal representing swash plate angle. For variable displacement axial piston pumps, torque is proportional to the working fluid pressure, swash plate displacement and hydromechanical efficiency. Displacement, in turn, is proportional to swash plate angle. The conversion between torque and angle (and vice versa) is achieved of a process of interpolation.

A data set is obtained by experimentation to determine, for a given class of pump/motor unit (and gearbox if applicable), the pressure and rotational speed values for given swash plate angles. A characteristic pump/motor unit will operate in conditions of between 0-350 bar at speeds between 0-2,200 rpm for swash plate angles of −15 degrees to +15 degrees. Conveniently, 35 bar increments, 200 rpm increments and 3 degree increments are adopted. The data set thus can be thought of as 11 'angle tables' (ie. −15, −12, . . . , 0, +3, . . . ,+15 degrees), each having 11 pressure×11 speed values.

The data sets thus require a measurement of pump/motor unit speed, which is provided to the ECU 90 by a pump/motor unit speed sensor 120. The pump/motor unit pressure is determined from a pressure sensor 122.

Figure 6:
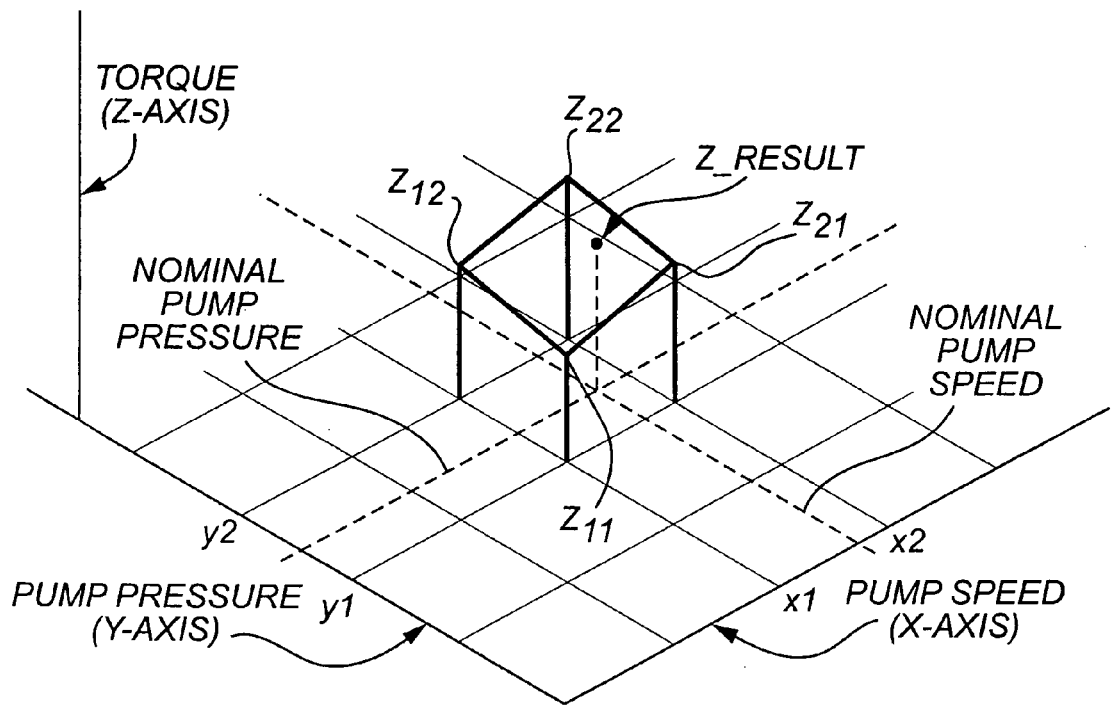
FIGS. 6 and 7 are graphs used to derive a measure of actual torque.

Consider now the conversion of torque ($z$) to angle ($\theta$). For a commanded torque value ($z_{comm}$), the actual/nominal pressure and speed values are ascertained, and for each angle table the adjacent pressures ($y_1$, $y_2$) and speeds ($x$, $x_2$) are identified. As shown in FIG. 6, for a given angle table there will be a set of combinations ($x_1$, $y_1$), ($x_1$, $y_2$), ($x_2$, $y_1$), ($x_2$, $y_2$) nearest the nominal value ($x_{nom}$, $y_{nom}$) giving respective torque values of $z_{11}$, $z_{12}$, $z_{21}$, $z_{22}$. The process is to solve, for each angle table, for a torque value $z_{result}$, being a linear interpolation between $z_{11}$, $z_{12}$, $z_{21}$, $z_{22}$. There will now be a set of torque values for each angle ($\theta$): $z_{result,\theta}$. Two such torque values will be nearest the commanded torque, $z_{comm}$ in a ± sense (i.e. a 'just above' value and a 'just below' value), designated as $z_{result, above}$ and $z_{result, below}$.

Figure 7:
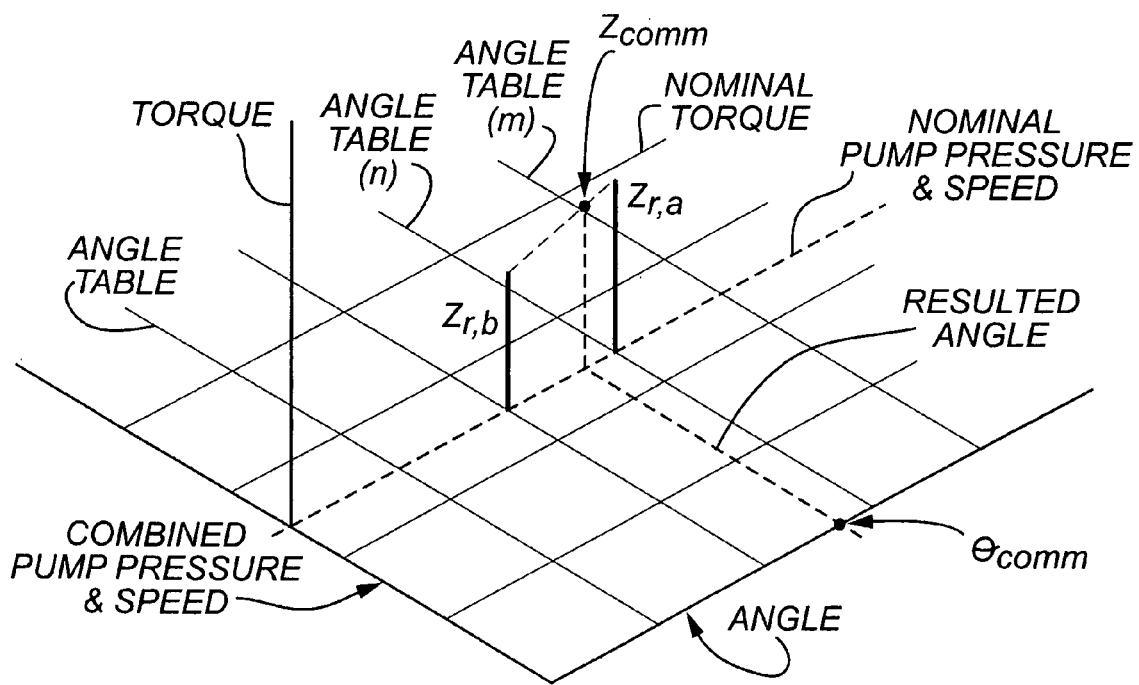

A process of linear interpolation is performed, as shown in FIG. 7, between $z_{result, above}$ (for angle m) and $z_{result, below}$ (for angle n) and $z_{comm}$, to derive a value of angle $\theta_{comm}$ lying between $\theta_m$ and $\theta_n$. This is the swash plate angle provided to the swash angle control actuator 86. Clearly swash plate angle ($\theta$) is a dynamic variable, responding to changes in commanded torque.

A swash angle feedback sensor 150 provides a feedback signal to the low-level control strategy unit 14 (embodied in the ECU 90). The conversion from measured angle to delivered torque follows the reverse process. The thusly calculated delivered torque is supplied to the high-level control unit 28 as the value 'actual torque' 32.

Clutch Operation

The clutch actuator 56 is shown only in general terms. An appropriate configuration is a pneumatic over hydraulic self-latching type. A pneumatic supply 130 is provided, under the control of a pneumatic clutch supply solenoid 132. A pilot hydraulic line 134 is also shown, providing sufficient pressure in Standby mode to operate the clutch piston 54. The clutching movement is controlled by a modulation solenoid 136.

It is usual that clutch slip protection will be provided in the event that the pump/motor unit 60 seizes. This is achieved by the mechanical rating of the clutch plates 52 and the operating pressure applied by the modulation solenoid 136.

A drive line speed and direction sensor 140 is also provided. The signal 29 derived from the sensor 140 is used in operation and protection schemes implemented by both the low-level and the high-level strategy control units 14, 28, as will be described.

Low-Level Strategy Control

Referring now to FIG. 8, it can be seen that there are a number of discrete states with an overall strategy 200 governing operation of the RDU 10. Each state represents a set of conditions that must be satisfied in order to pass safely to another state. The states can be thought of as rules designed to ensure safe and correct operation of the hydraulic circuits in particular. The Standby state 206, the Retard state 212 and the Propulsion state 224 have already been generally described with reference to FIGS. 2-4. The Dump mode is not shown in the state diagram. The remaining states (except the Disengaged state 236 and the Reverse state 238) can be thought of as transitions.

Start-Up State

Figure 9A:
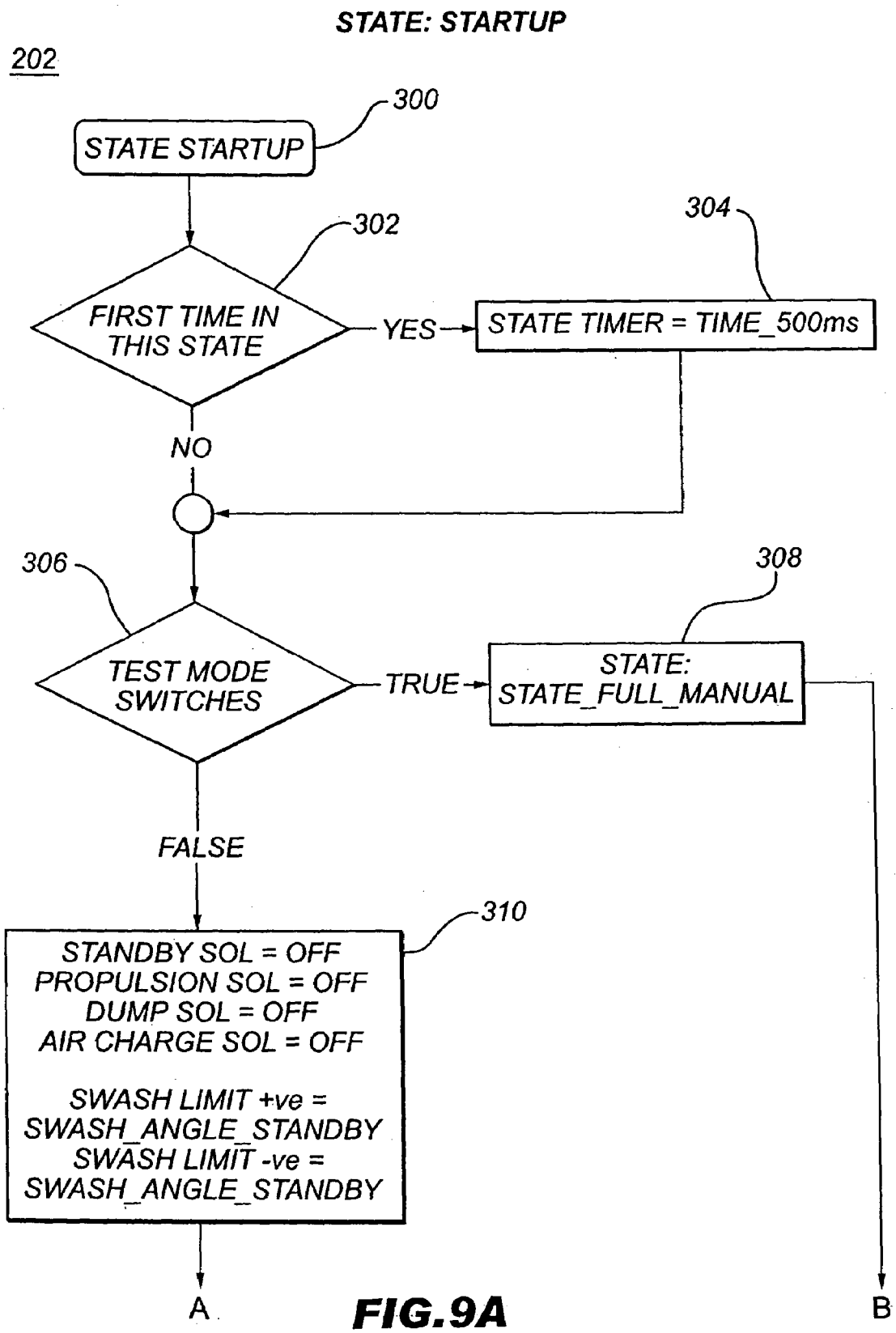
FIGS. 9-26 are block flow diagrams for the states of FIG. 8.
Figure 9B:
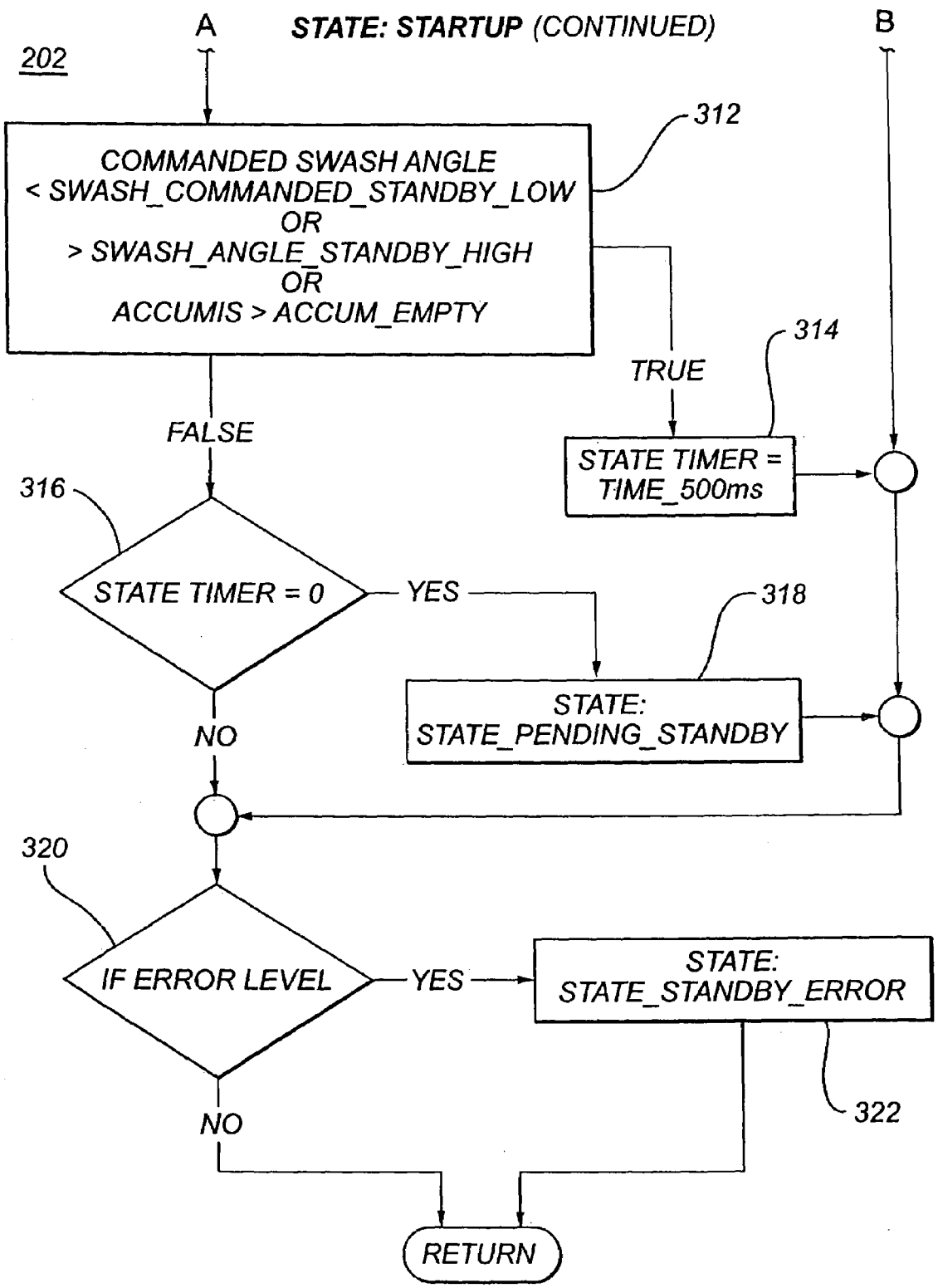

Referring then to FIG. 9, the start-up state occurs when the ECU 90 is first powered up (step 300), waiting for a period of 500 ms (steps 302, 304). The process determines whether a test mode (i.e. Full Manual) should be entered (steps 306, 308), and if not then the process turns all of the solenoids 72, 84, 100, 110 off, and drives the swash plate 61 to the standby angular position (step 310). The process then waits for an indefinite period for the commanded angle to be set to the standby position and for the accumulator to be empty (i.e. less than 20 bar) (steps 312, 314). Once this has occurred, the process waits for the state timer to decrement to 0 (step 316) before proceeding to the Pending Standby state 204 (step 318). Any error condition will cause entry of the Standby Error state 208 (steps 320, 322).

Pending Standby State

Figure 10A:
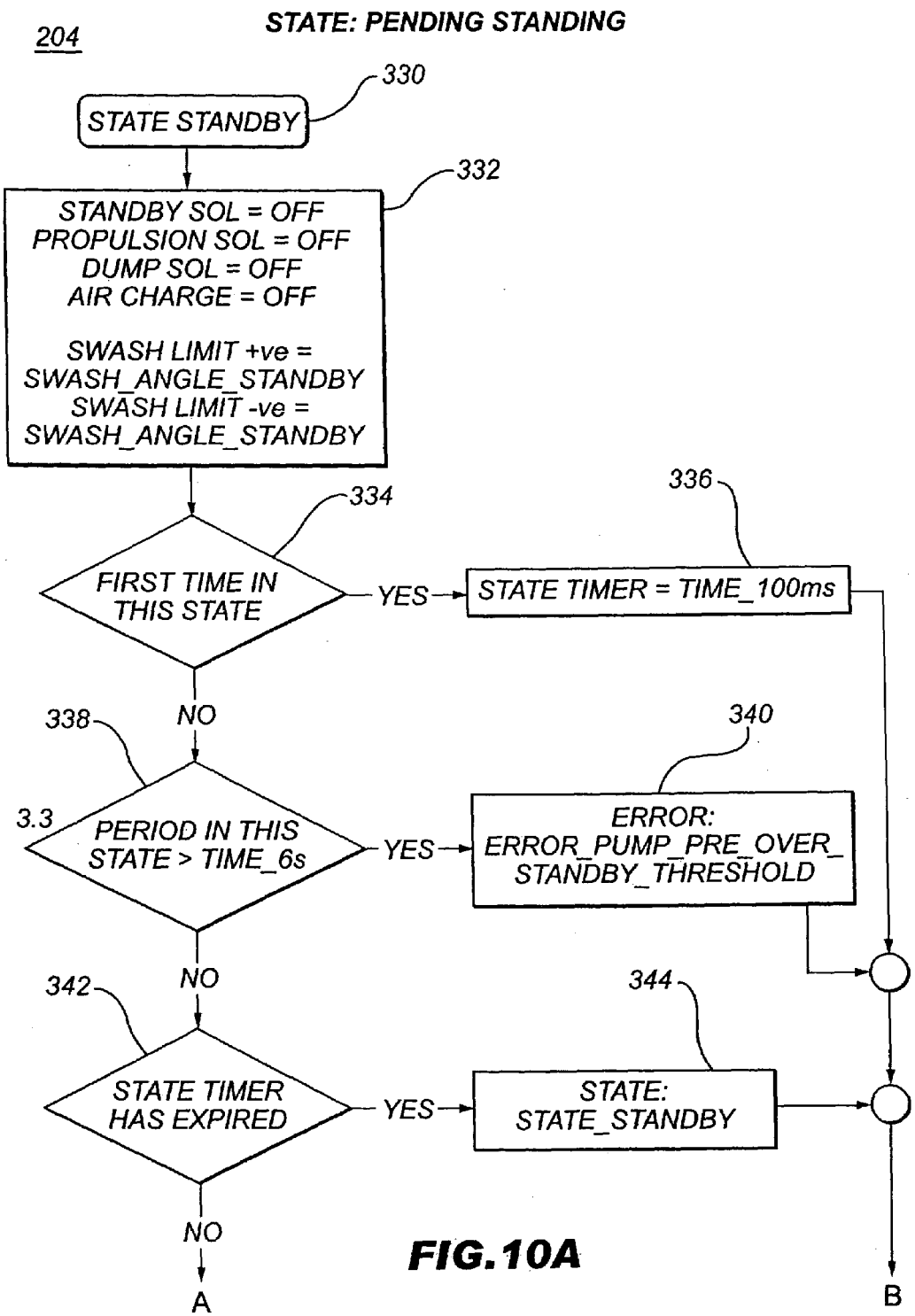
Figure 10B:
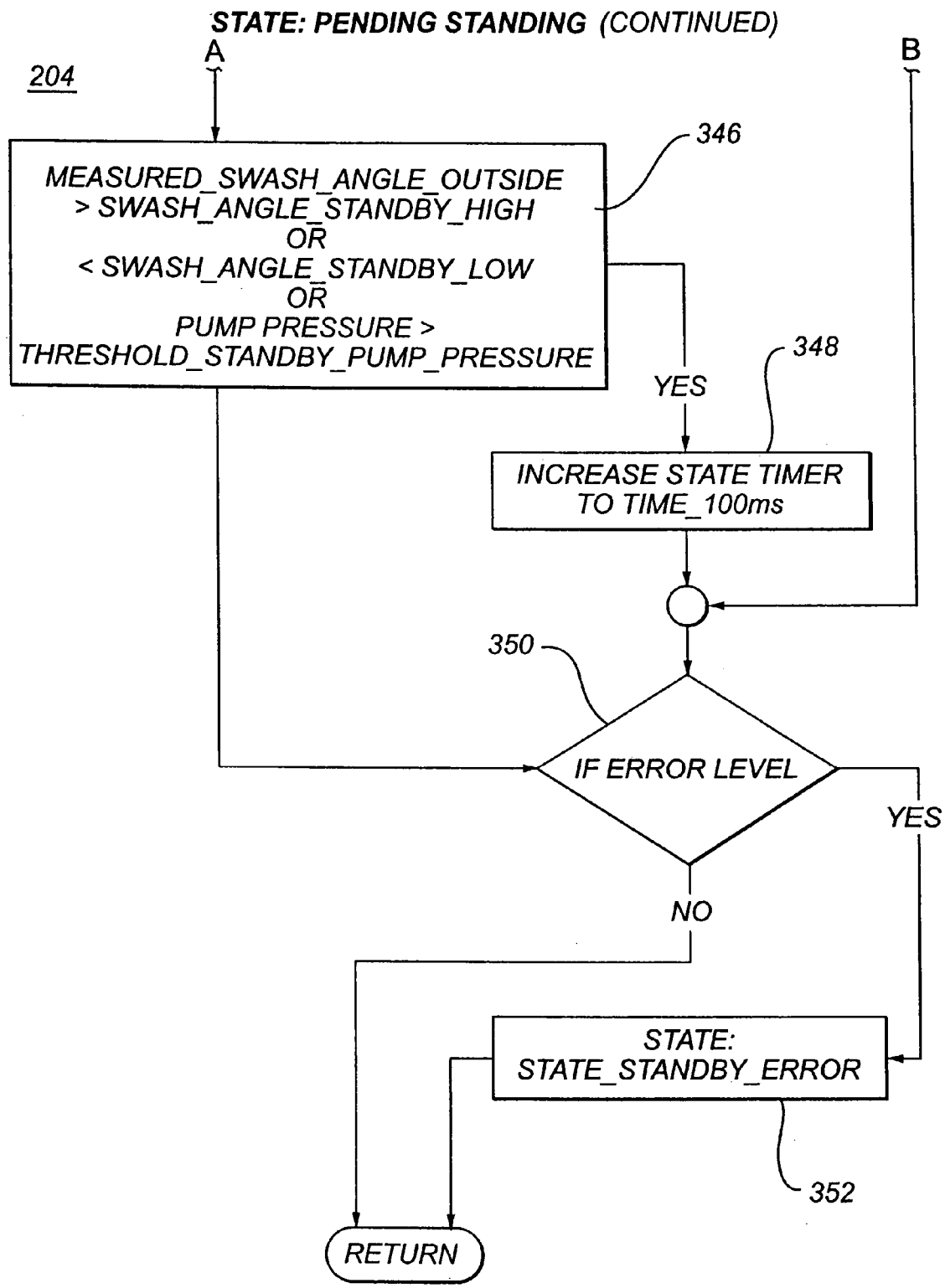
Figure 11A:
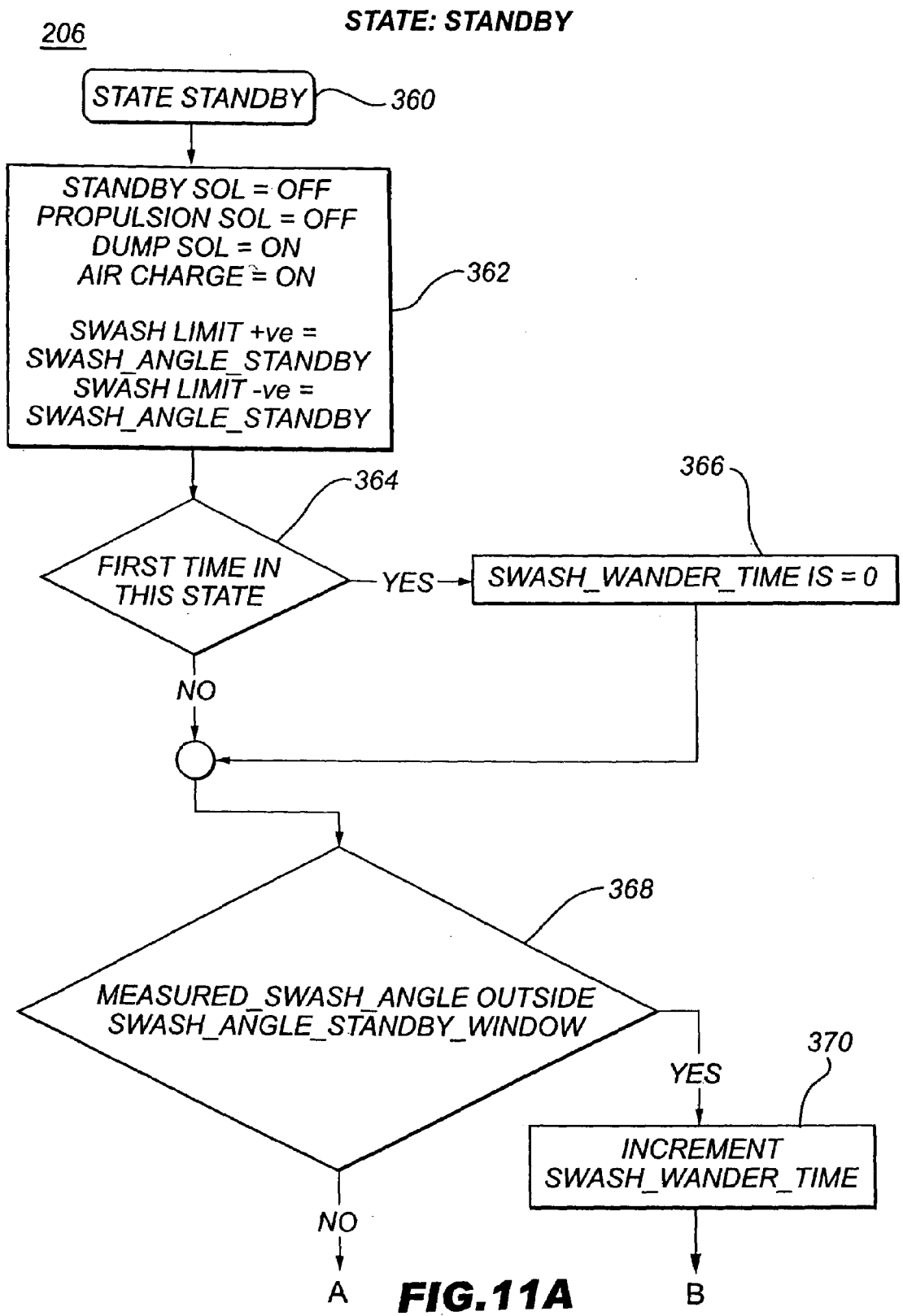
Figure 11B:
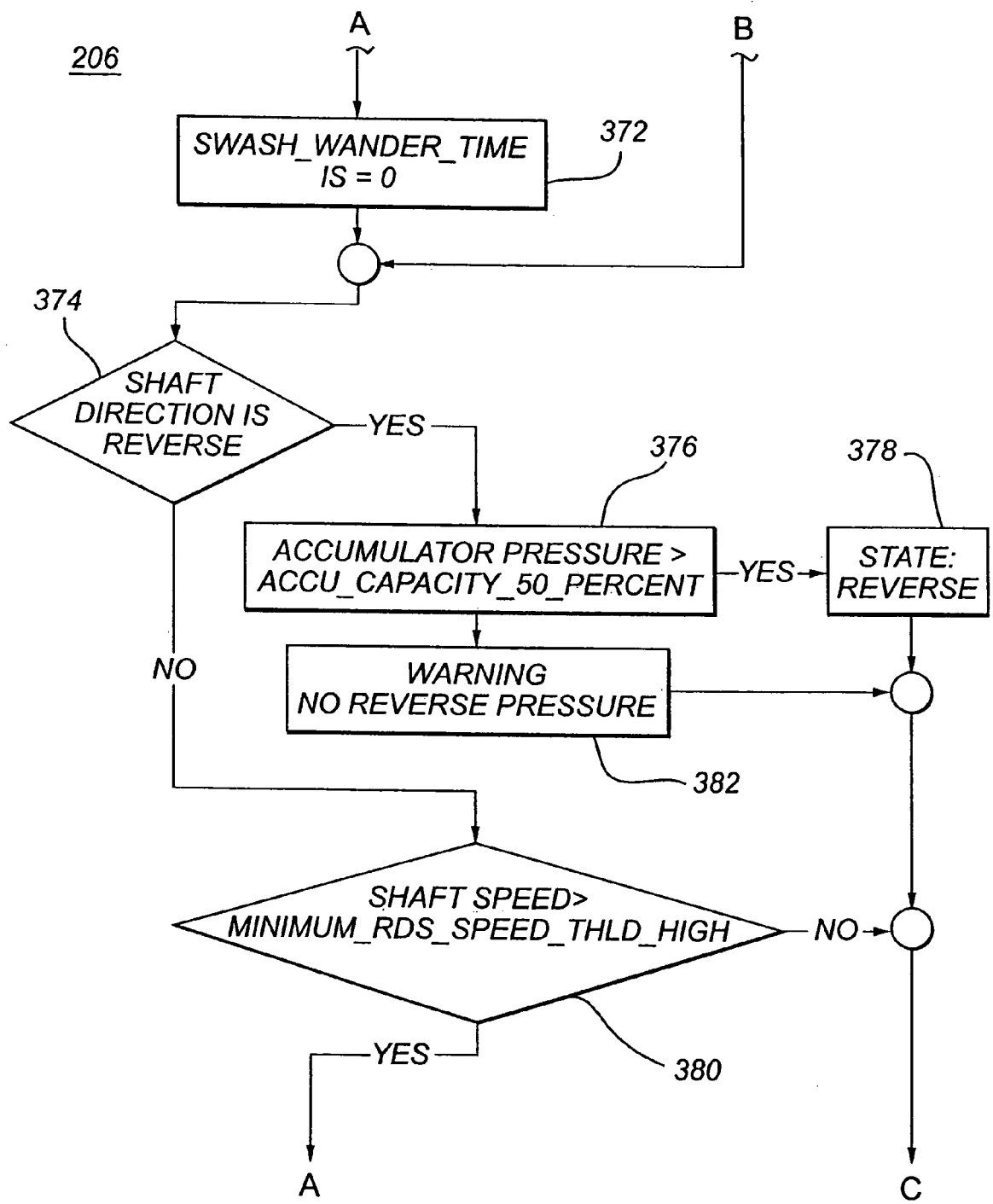
Figure 11C:
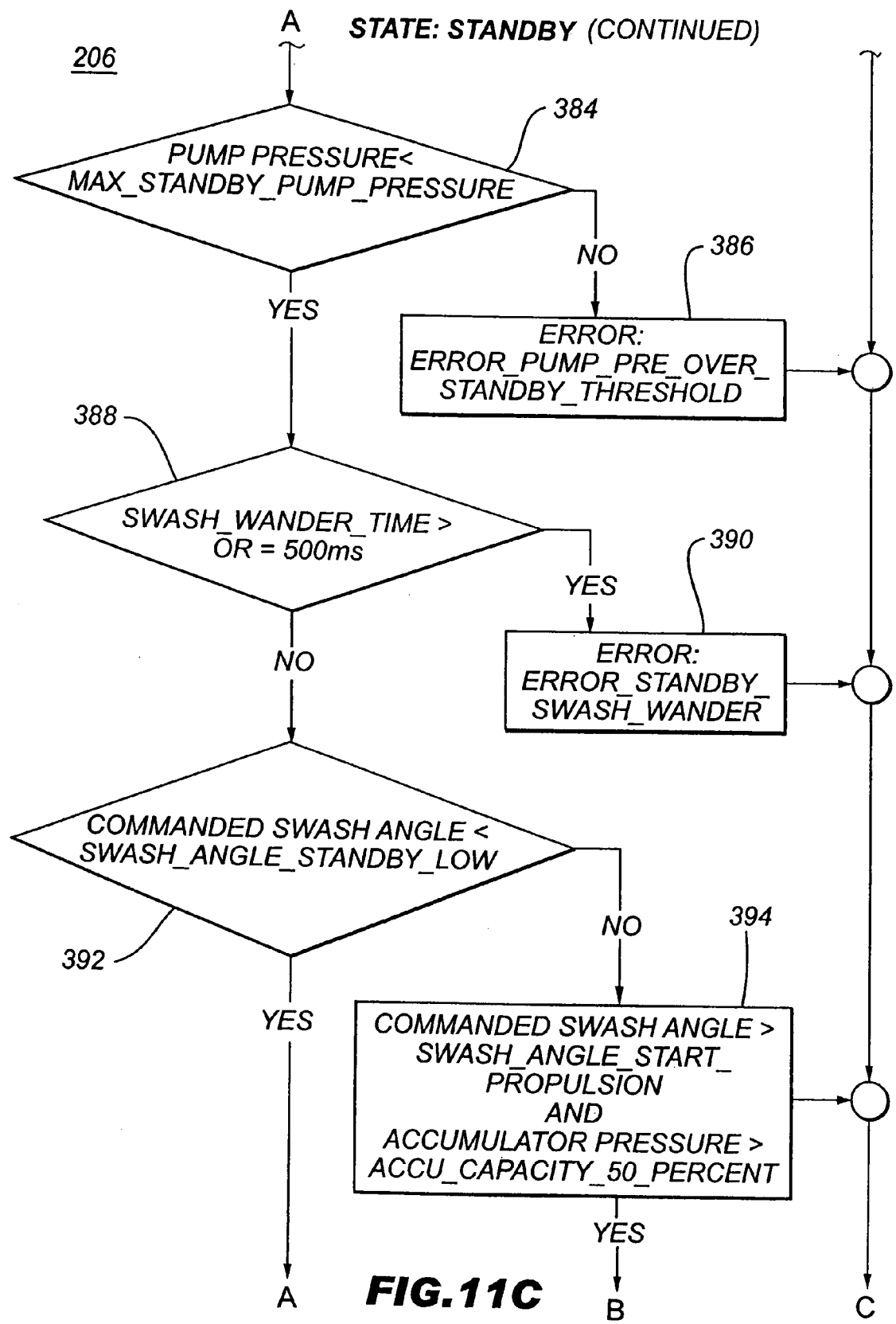
Figure 11D:
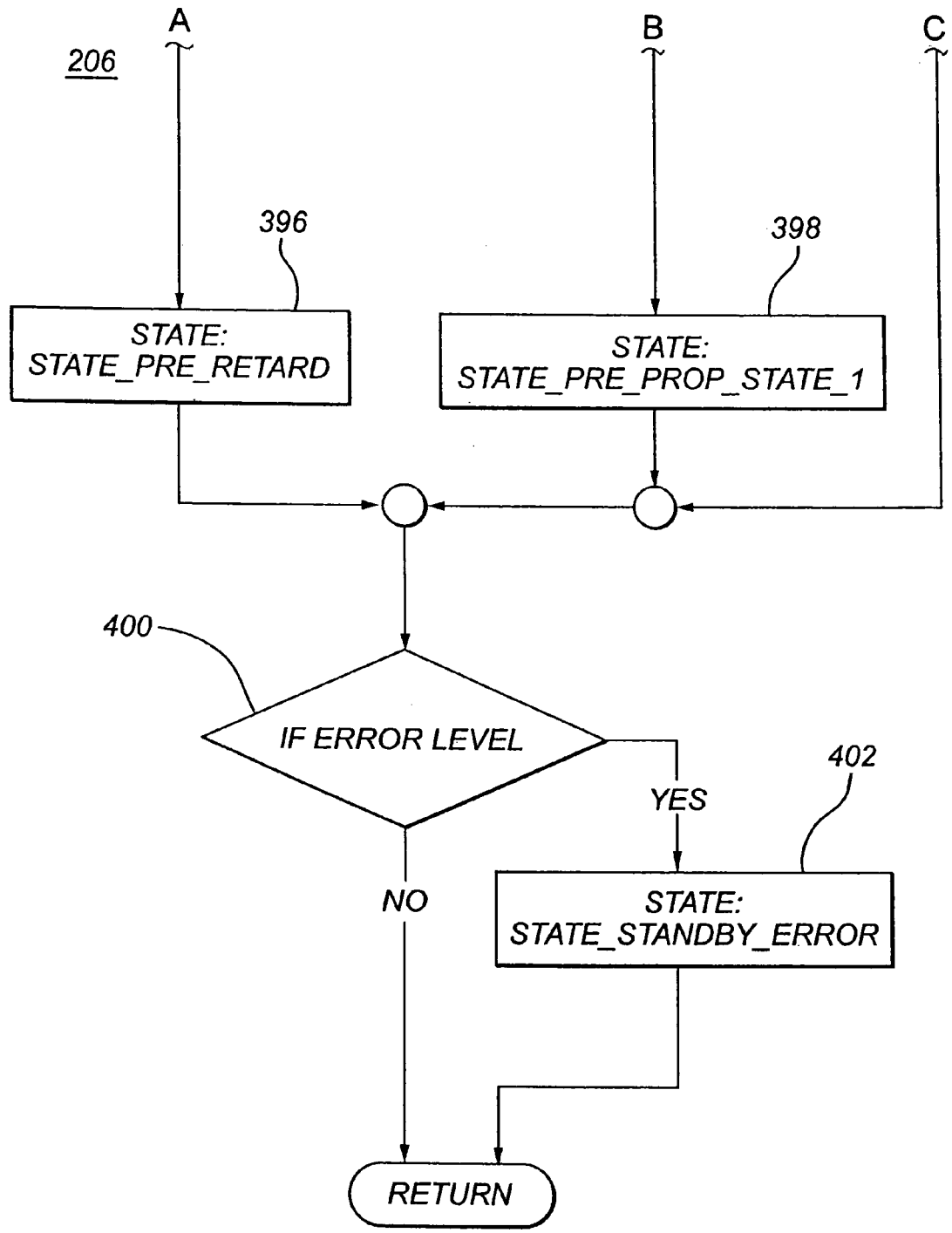

Referring then to FIG. 10, on entering the Pending Standby state 204 (step 330), the solenoids 72, 84, 100, 110 are set to standby conditions as mentioned above (step 332) causing the pump/motor unit 60 to unload, if necessary. The swash plate 61 is commanded to the standby position (step 332 also). A minimum state timer is set to 100 ms (steps 334, 336). Up to 6 seconds is allowed for the swash plate 61 to move into the standby angular window and for the pump to unload to less than 45 bar (i.e. the standby pressure) (steps 338, 346). Once this has occurred and the state timer has expired (step 342), the flow progresses to the Standby state (step 344). If swash plate 61 has not moved into the standby window within 6 seconds, or the pump/motor unit pressure remains high, the process flags a condition of 'pump pressure over standby threshold' (step 340). This leads to the Standby Error state 208 (steps 350, 352).

Standby State

Referring then to FIG. 11, on entering the Standby state 206 (step 360), the solenoids 72, 84, 100, 110 are set to the standby conditions (step 362). The process then checks the positional stability of the swash plate 61 by measuring the time that it may be outside the swash angle window (steps 364, 366, 368). If not stable, then an error occurs (steps 388, 390). Once the swash plate is stabilised, the process checks the direction of rotation of the drive shaft 50 by the sensor 140. If a "reverse" condition is detected, and the accumulator pressure is at 50% capacity, the process proceeds to the Reverse state 238 (steps 374, 376, 378). Otherwise, if the shaft direction is forward, the process then checks if the shafts's speed is greater than a minimum high speed threshold (step 380), and if the pump/motor unit pressure is less than a maximum standby pump pressure (i.e. 45 bar) (step 384). If yes, then the process proceeds to check the commanded swash plate position (step 392). If the position is less than a Standby low-level (step 392), then the process leads to the Pre-Retard state 210. If the commanded position of the swash plate 61 is in a Start Propulsion condition, and the accumulator as at 50% capacity (step 394), then the process leads to the Pre-Propulsion Stage 1 state 218 (step 398). Any errors lead to the Standby Error state 208 (steps 400, 402). There is additionally a transition to the Disengaged state 236 that is not specifically shown in FIG. 11. If no commanded torque value above or below the standby value arises within a predetermined period of time, then the pump/motor unit 60 should be disengaged from the drive train 12 by the operation of the clutch 22.

Standby Error State

Figure 12:
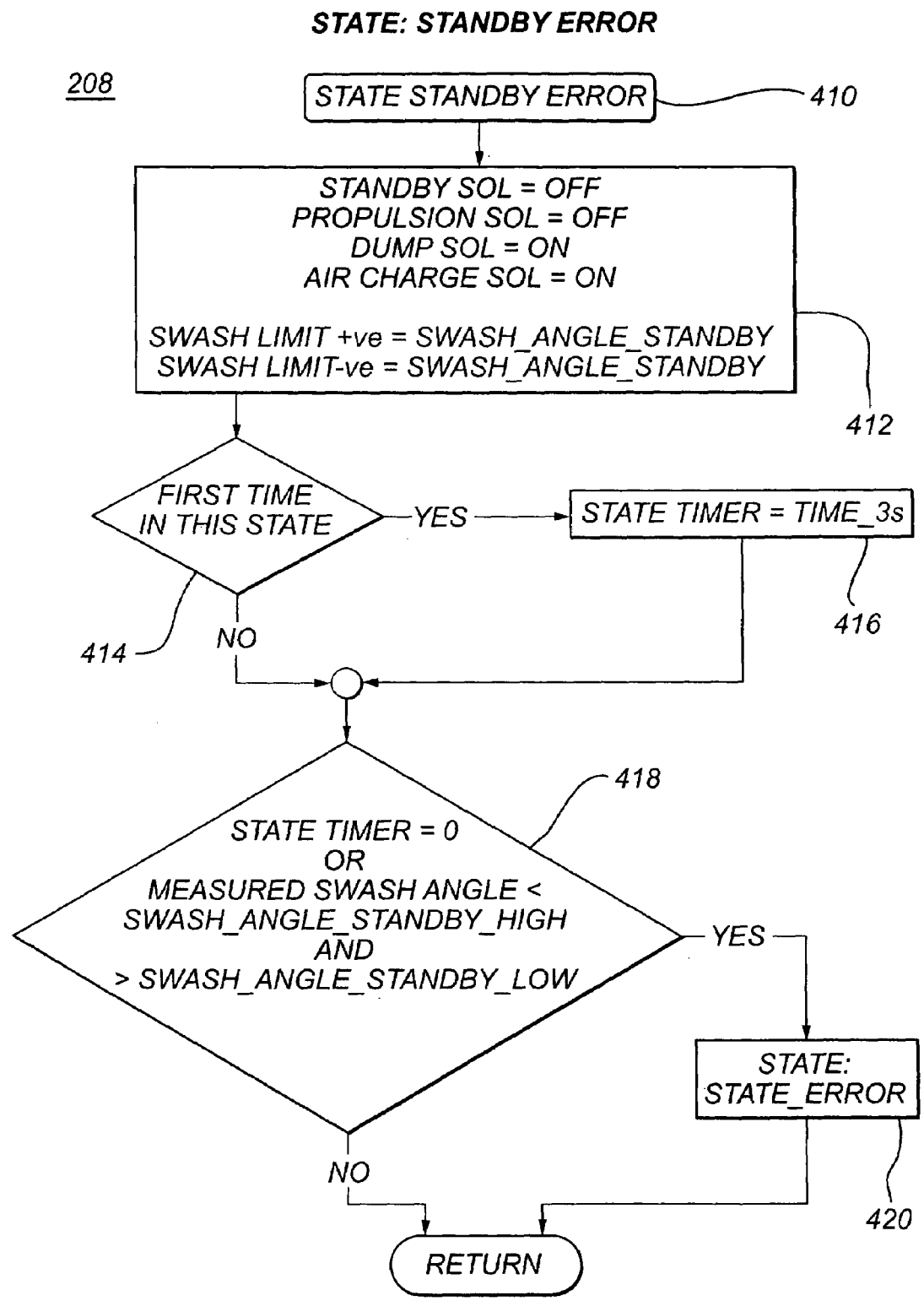

Referring now to FIG. 12, on entering the Standby Error state 208 (step 410), the solenoids 72, 84, 100, 110 are set to standby conditions (step 412). The swash plate solenoid 86 is commanded to the standby position (step 412 also). A minimum state timer is set to three seconds, meaning that up to three seconds are allowed for the swash plate 61 to move into the standby window (steps 414, 416). Once this has occurred, or if three seconds expires (step 418), there is an unconditioned transition to the Error state 234 (step 420).

Pre-Retard State

Figure 13A:
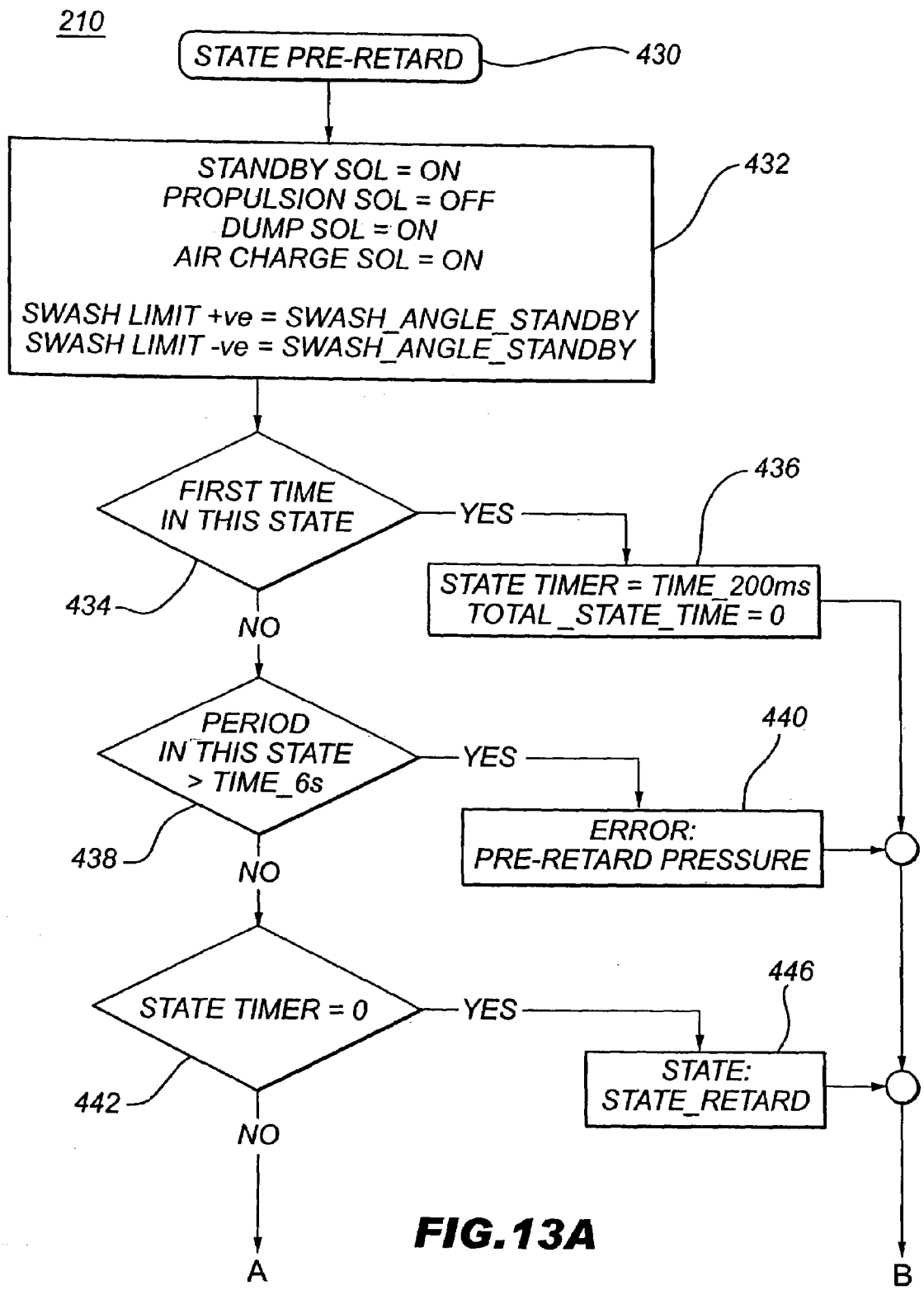
Figure 13B:
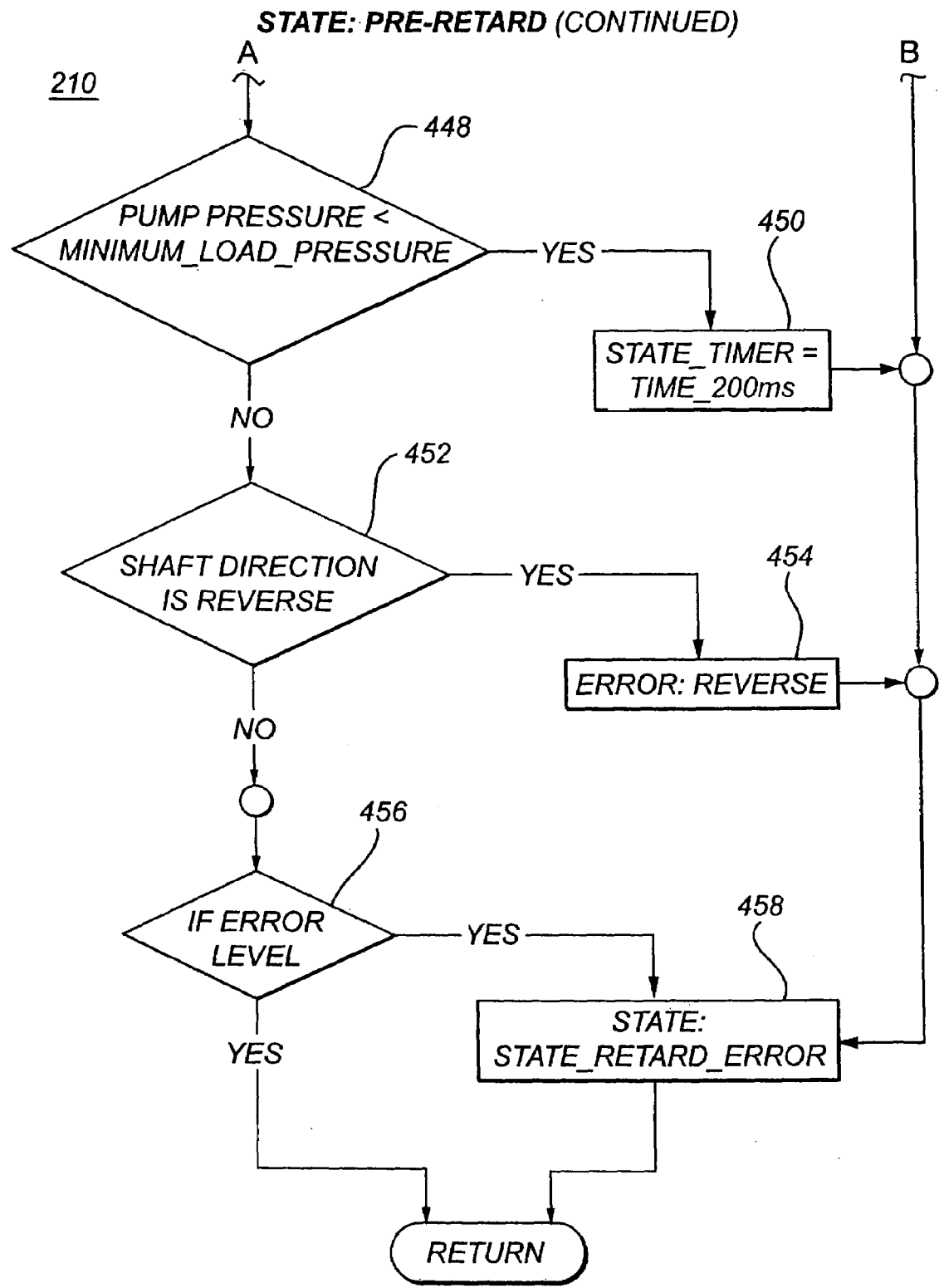

Referring now to FIG. 13, when the Pre-retard state 210 is entered (step 430), the standby solenoid 72 is switched on, as are the dump and air charge solenoids 84, 100, 110. This allows the pump/motor unit 60 to load, if not already loaded. The swash plate solenoid 86 is commanded to the standby position (step 432 also). A minimum state timer is set to 200 ms (steps 434, 436). Up to six seconds are allowed for the pump/motor unit 60 to load (steps 438, 448), or a pre-retard pressure error flag is raised (step 440), and the process proceeds to the Retard Error state 214 (step 458). If the pump loads within six seconds (step 442), the process proceeds to the Retard state 212 (step 446). If the drive shaft is rotating in the reverse direction (step 452), the process raises an error flag (step 454) and proceeds to the Retard Error state 214 (step 458).

Retard State

Figure 14A:
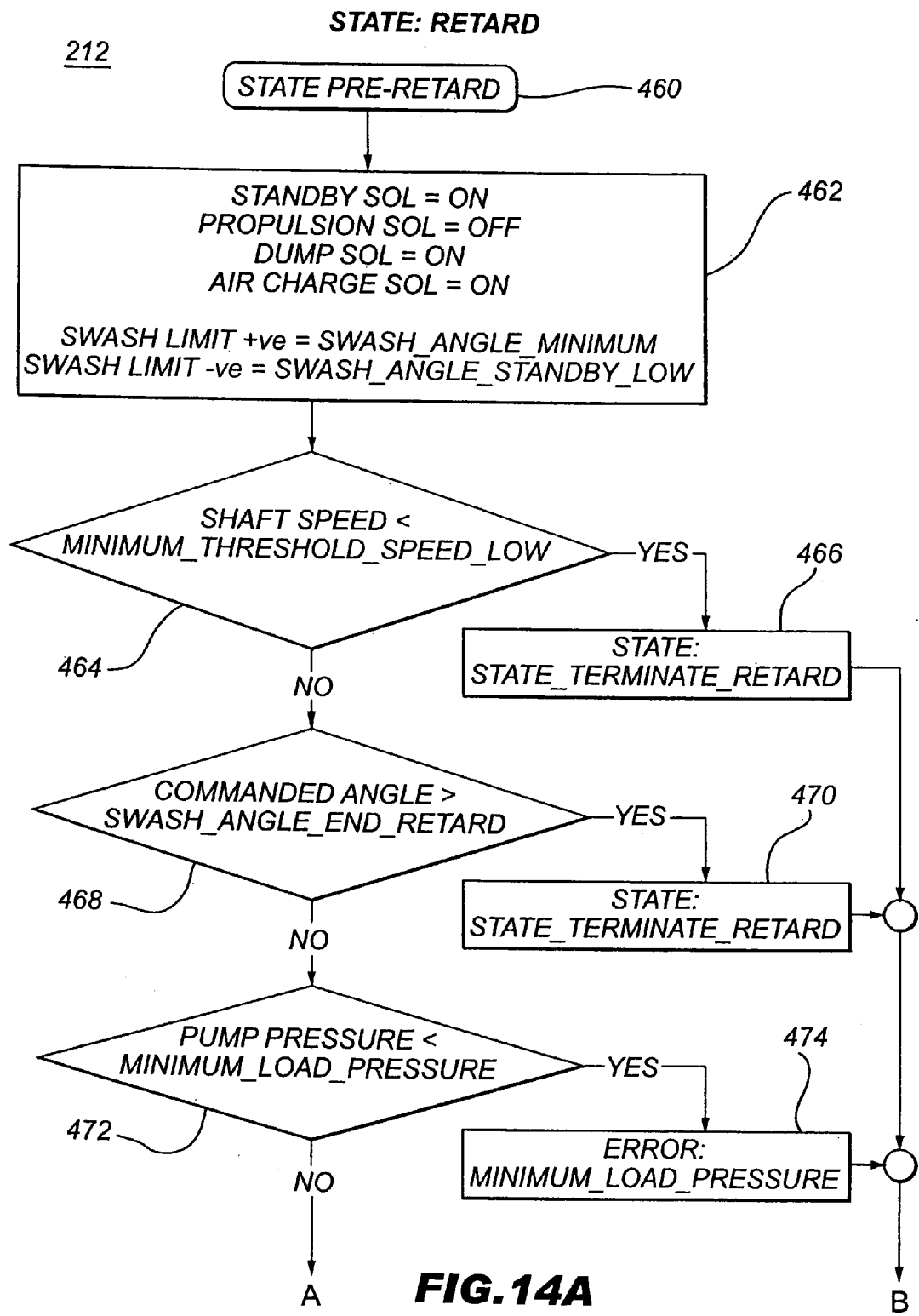
Figure 14B:
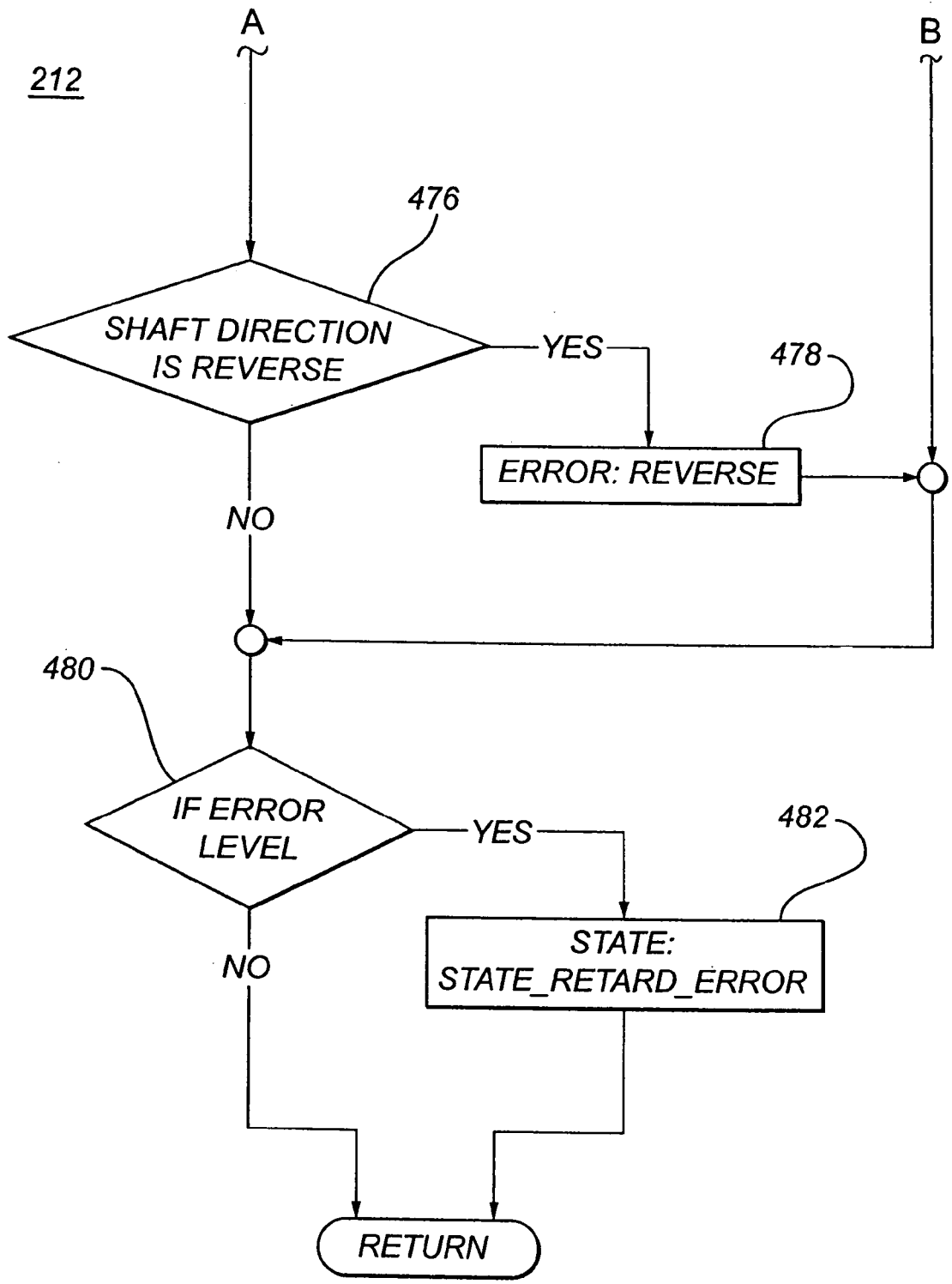

Referring now to FIG. 14, when the Retard state 212 is entered (step 460), the solenoids 72, 84, 100, 110 are set to loaded conditions (step 462). The swash solenoid 86 moves the swash plate 61 to the calculated commanded retard angle (step 462 also). A continuous check is made of the drive shaft speed to determine that it is above a minimum threshold speed (step 464), and also to determine that the command has not returned to "standby" (step 468). If either conditions are true, then the process proceeds to the Terminate Retard state 216 (steps 466, 470). The pump/motor unit pressure is also continually checked (step 472), and any low pressure will cause a minimum low pressure error flag to be raised (step 474), and the process proceeds to the Retard Error state 214 (steps 480, 482). If the drive shaft is rotating in the reverse direction, then a reverse error is flagged, and the process to proceed to the Retard Error state 214 (step 482).

Retard Error State

Figure 15:
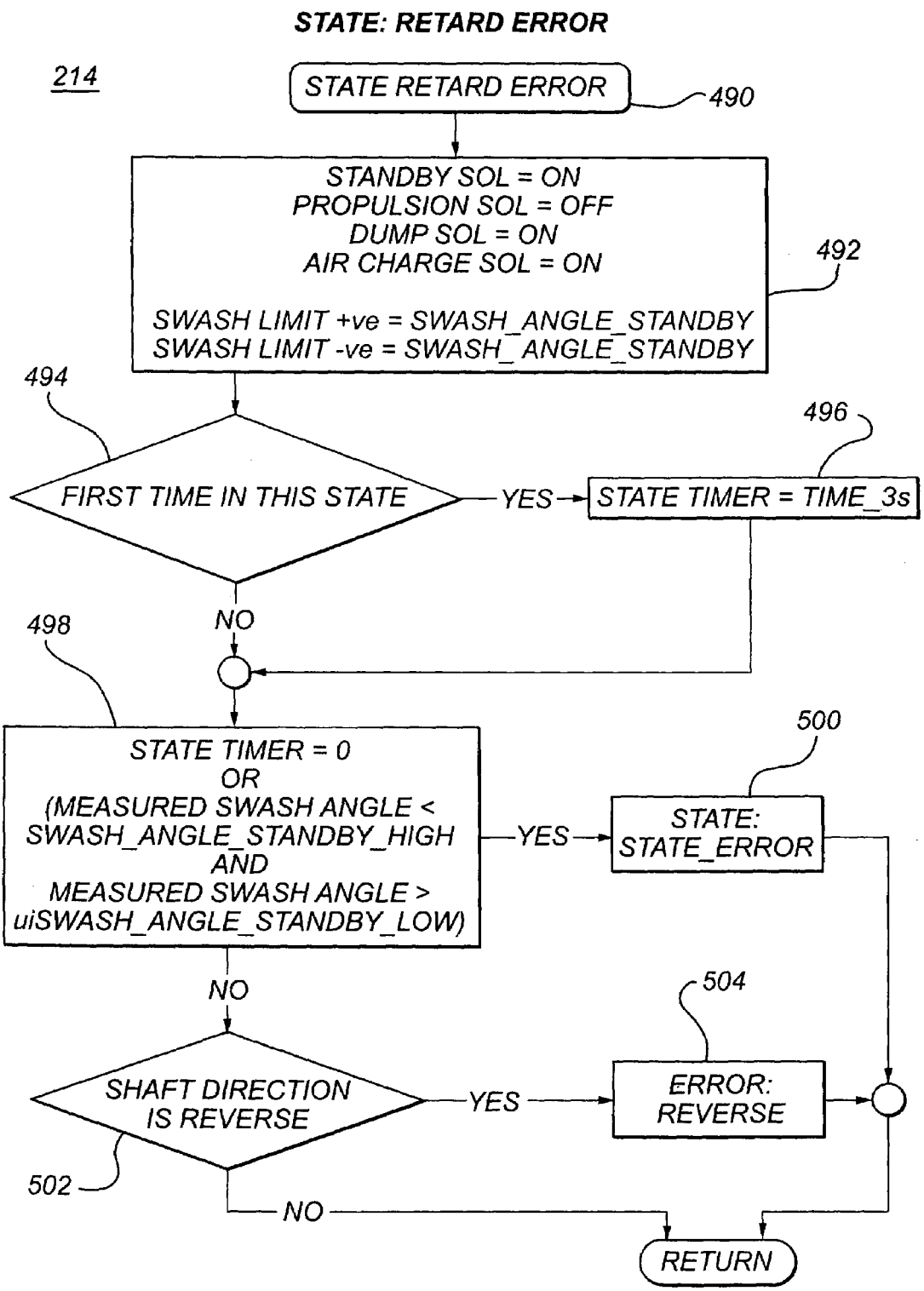

Referring now to FIG. 15, on entering the Retard Error state 214 (step 490), the solenoids 72, 84, 100, 110 are set to the loaded conditions, meaning that the standby solenoid 72 is activated. The swash plate 61 is limited to standby angle conditions (step 490 also). A minimum state timer is set to three seconds, giving up to three seconds for the swash plate to move in to the standby window (steps 494, 496, 498). Once this has occurred, or the three second period expires, the process unconditionally proceeds to the Error state 214 (step 500). If the shaft is rotating in the reverse direction, then the process raises a reverse error flag (step 504).

Terminate Retard State

Figure 16A:
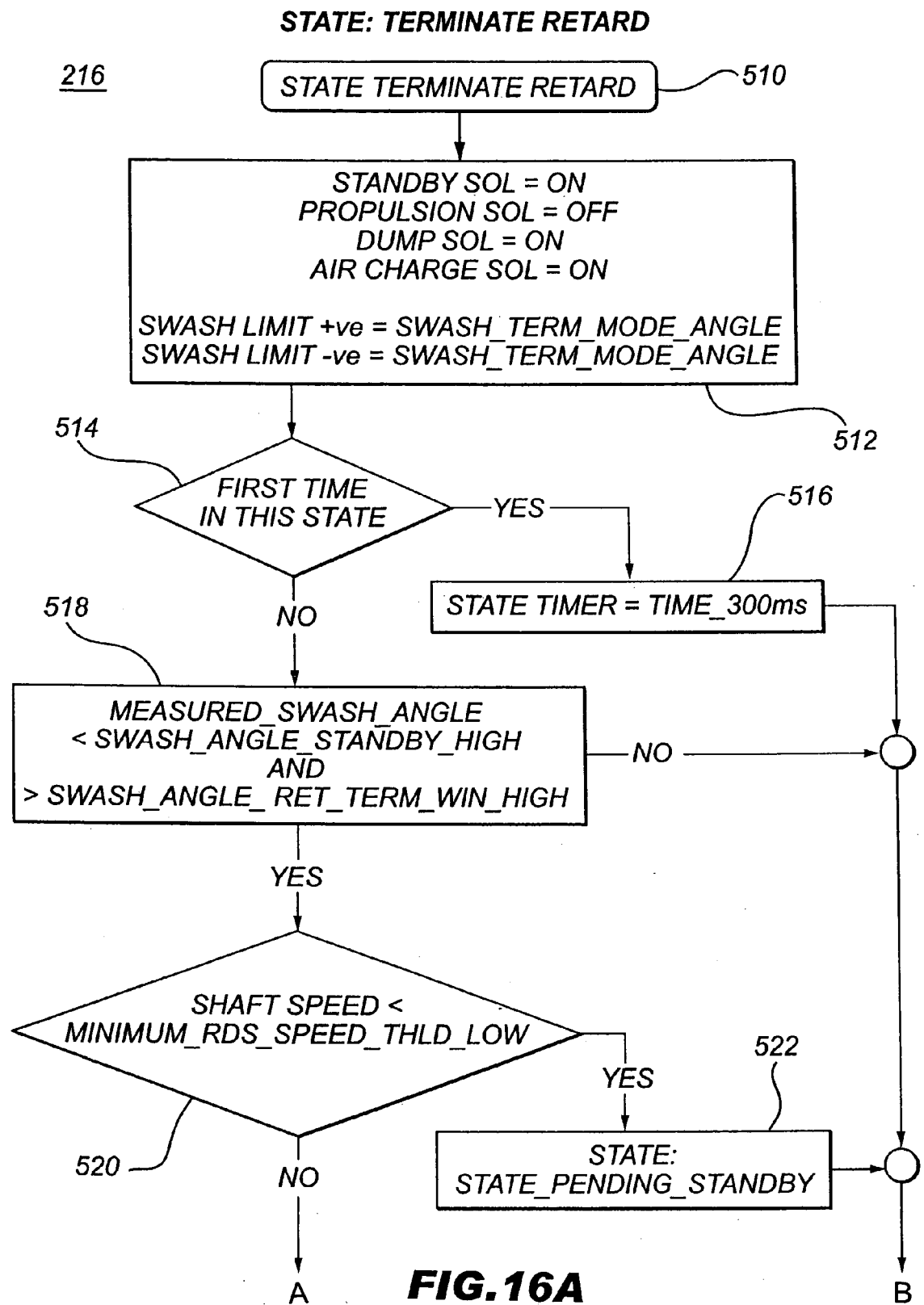
Figure 16B:
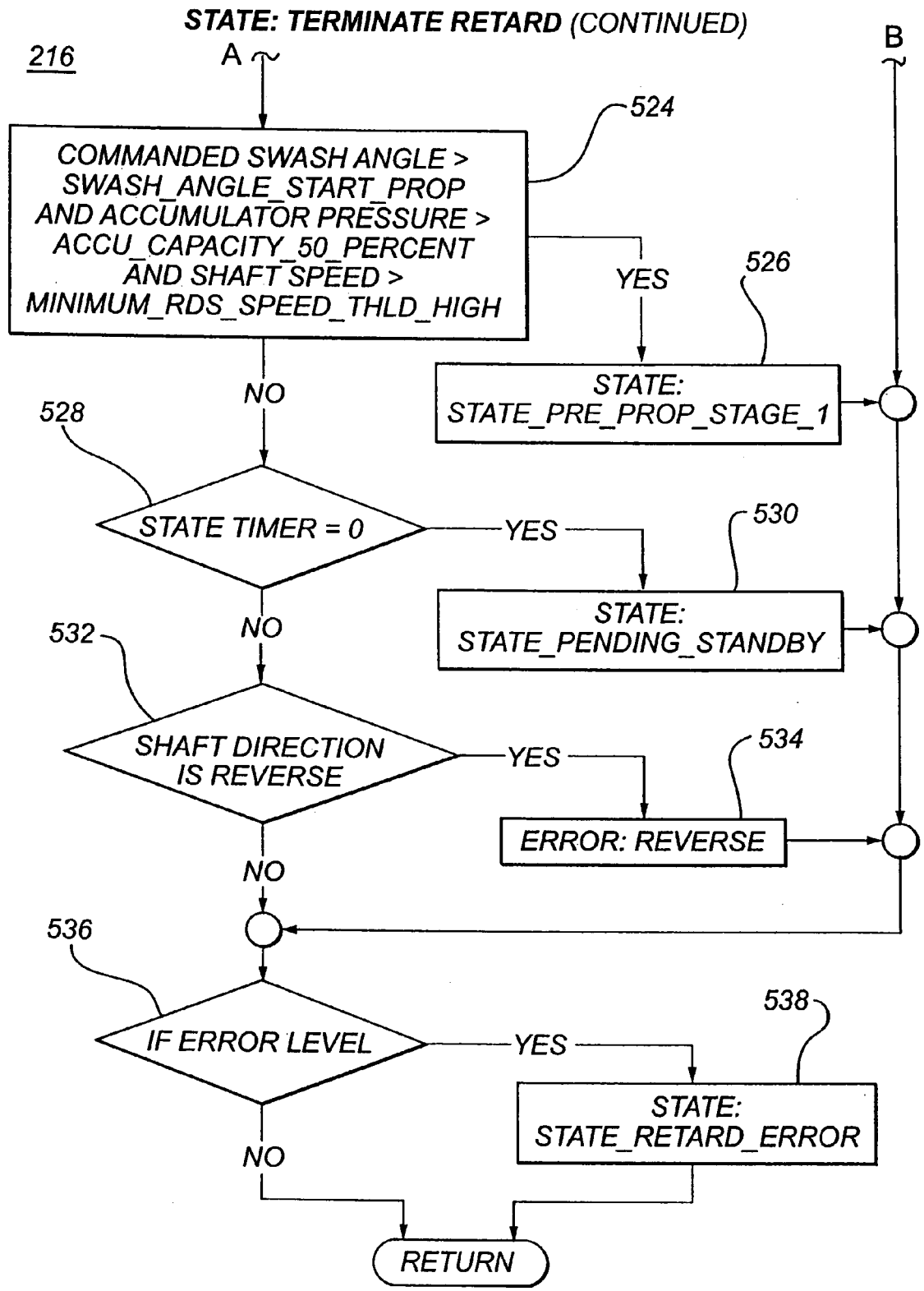

Referring now to FIG. 16, on entering the Terminate Retard state 216 (step 510), the solenoids 72, 84, 100, 110 are set such that, in particular, the propulsion solenoid 100 is deactivated. With the pump/motor unit 60 still loaded, the swash plate 61 is commanded to the min/max swash terminate mode angle (step 512). A state timer is set to 300 ms (steps 514, 516), and therefore waits until the swash plate 61 moves into the window (step 518) before deciding if the high-level command has moved directly to propulsion. If not, or if the drive shaft speed has dropped below a minimum speed threshold (step 520), then the process proceeds to the Pending Standby state 204 (steps 522, 530). If, on the other hand, the drive shaft speed is above the minimum threshold, the command has changed to propulsion, the shaft is rotating in the forward direction and there is more than 50% accumulator capacity (step 524), then the process moves to the Pre-propulsion Stage 1 state 218 (step 526). Any errors if detected result in progress to the Retard Error state 214 (steps 532, 534, 536, 538).

Pre-Propulsion Stage 1 State

Figure 17A:
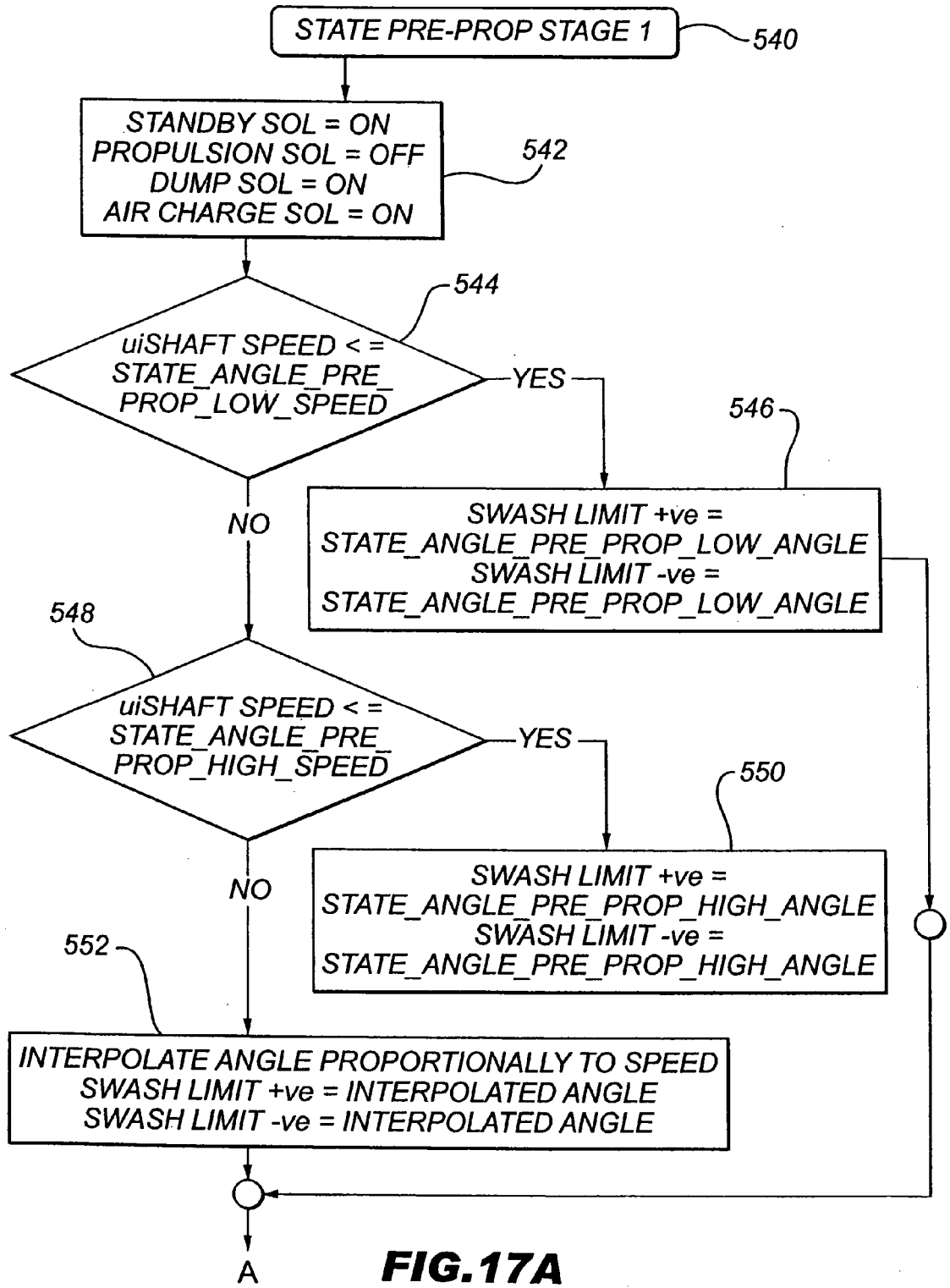
Figure 17B:
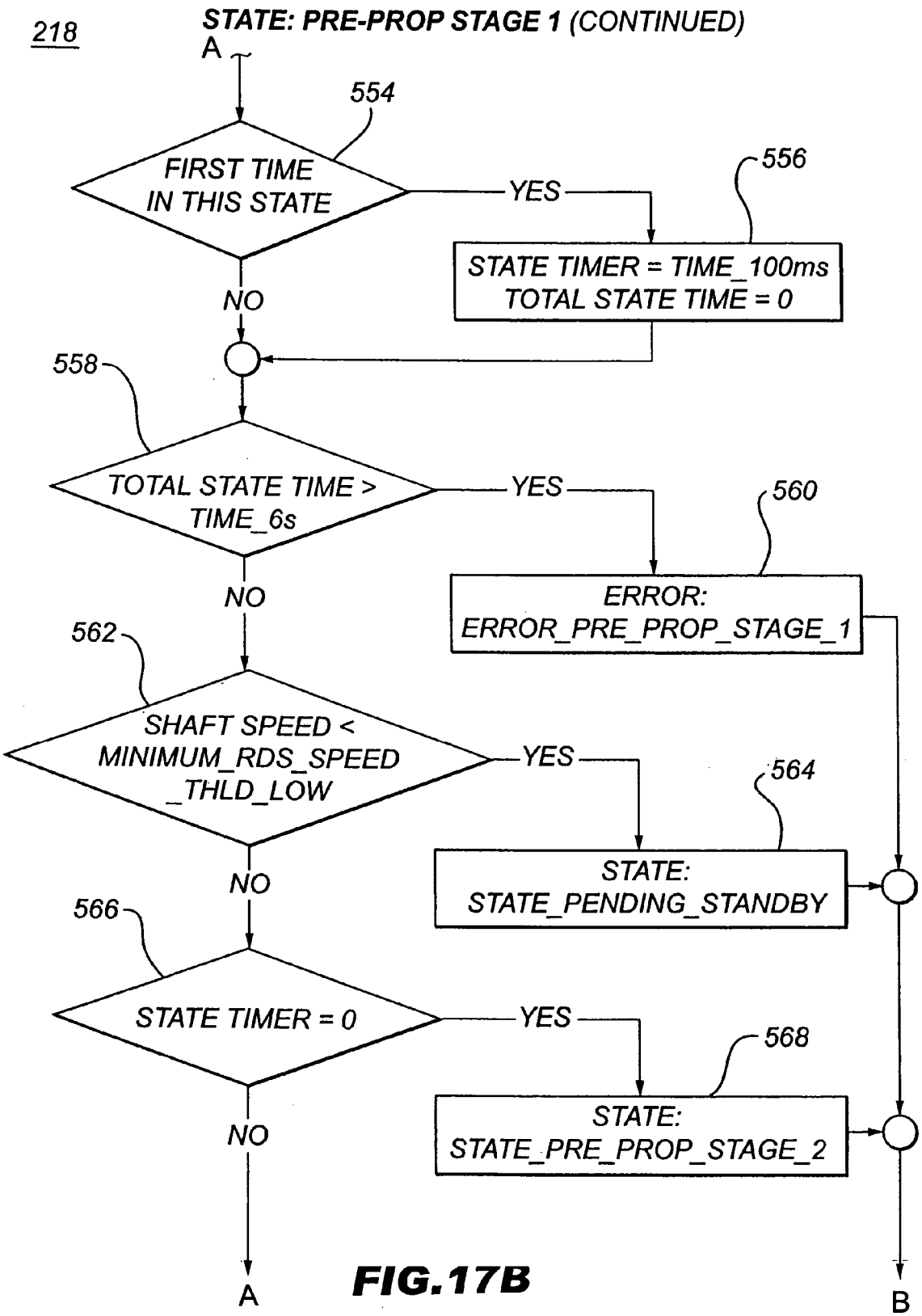
Figure 17C:
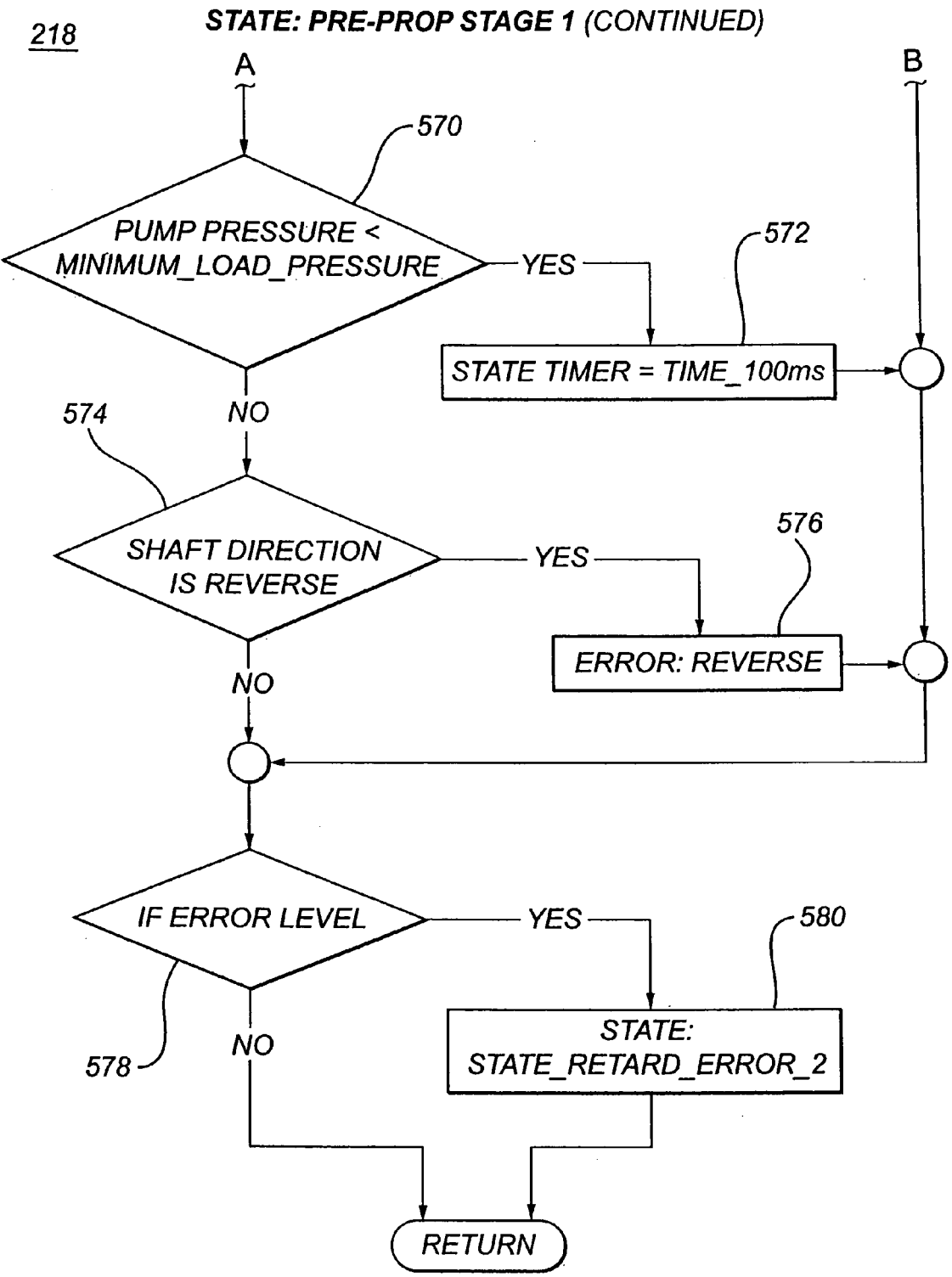

Referring now to FIG. 17, on entering the Pre-Propulsion Stage 1 state 218 (step 540), the solenoids 72, 84, 100, 110 are set to loaded conditions, causing the pump/motor unit 60 to load, if not already so (step 542). The swash plate is commanded to an angle relative to the shaft speed (step 552) as previously described with reference to FIGS. 6 and 7). The process ensures that the minimum load pressure is achieved even at very low speeds (steps 544, 546, 548, 550). If it is the first time in the state, the state timer is set to 100 ms (steps 554, 556). Up to six seconds is allowed for the recovery according to the following checks: speed higher than threshold speed (step 562); and the pump is loaded (step 570). If these checks are satisfied, then the process proceeds to Pre-propulsion Stage 2 state 220 (step 568). If not, then the process proceeds to the Propulsion Error 2 state 222 (steps 578, 580). If the drive shaft is rotating in the reverse direction, then the process flags an error (steps 574, 576). If the shaft speed is less than the threshold value, the process proceeds to the Pending Standby state 204 (steps 562, 564).

Pre-Propulsion Stage 2 State

Figure 18A:
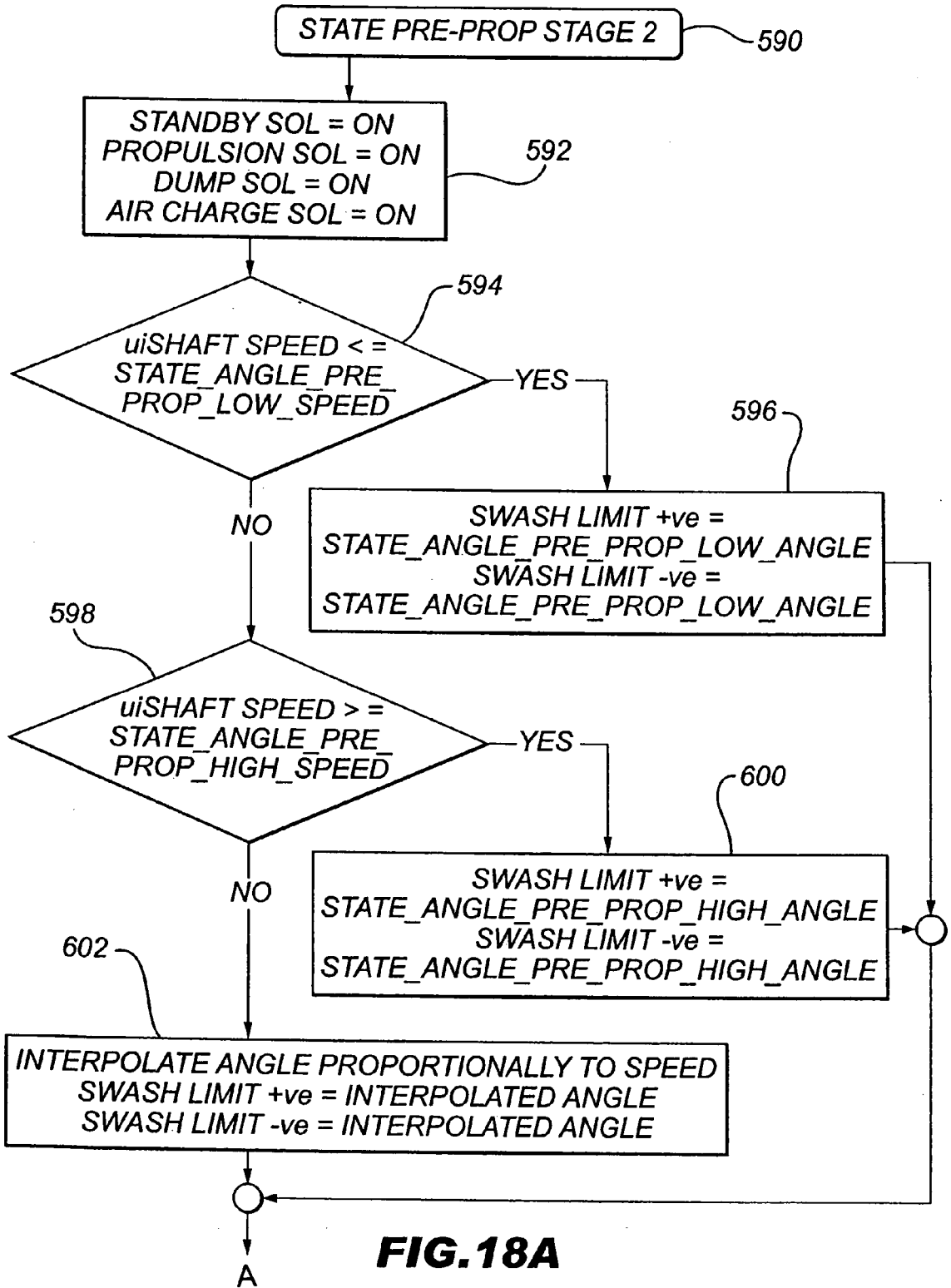
Figure 18B:
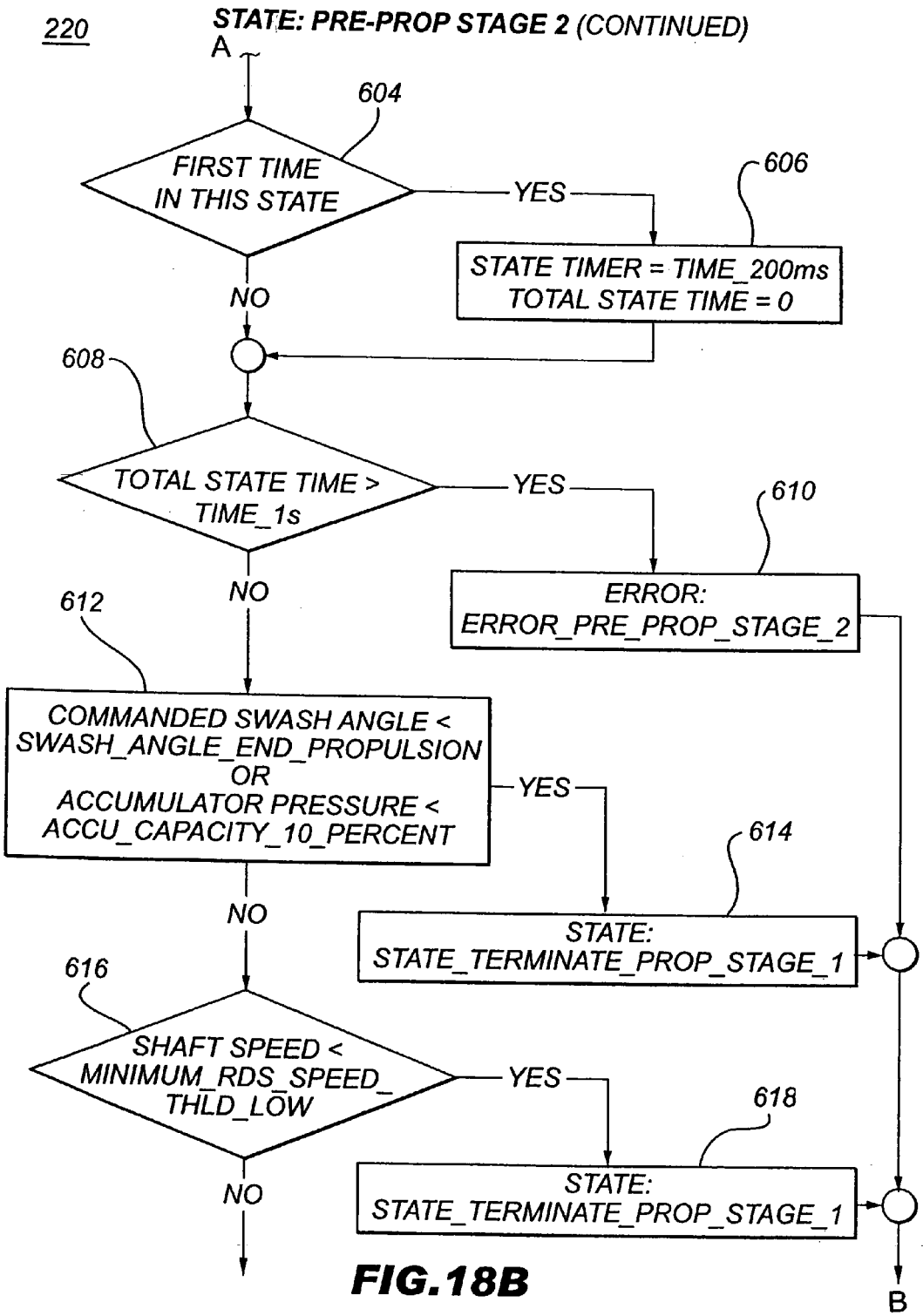
Figure 18C:
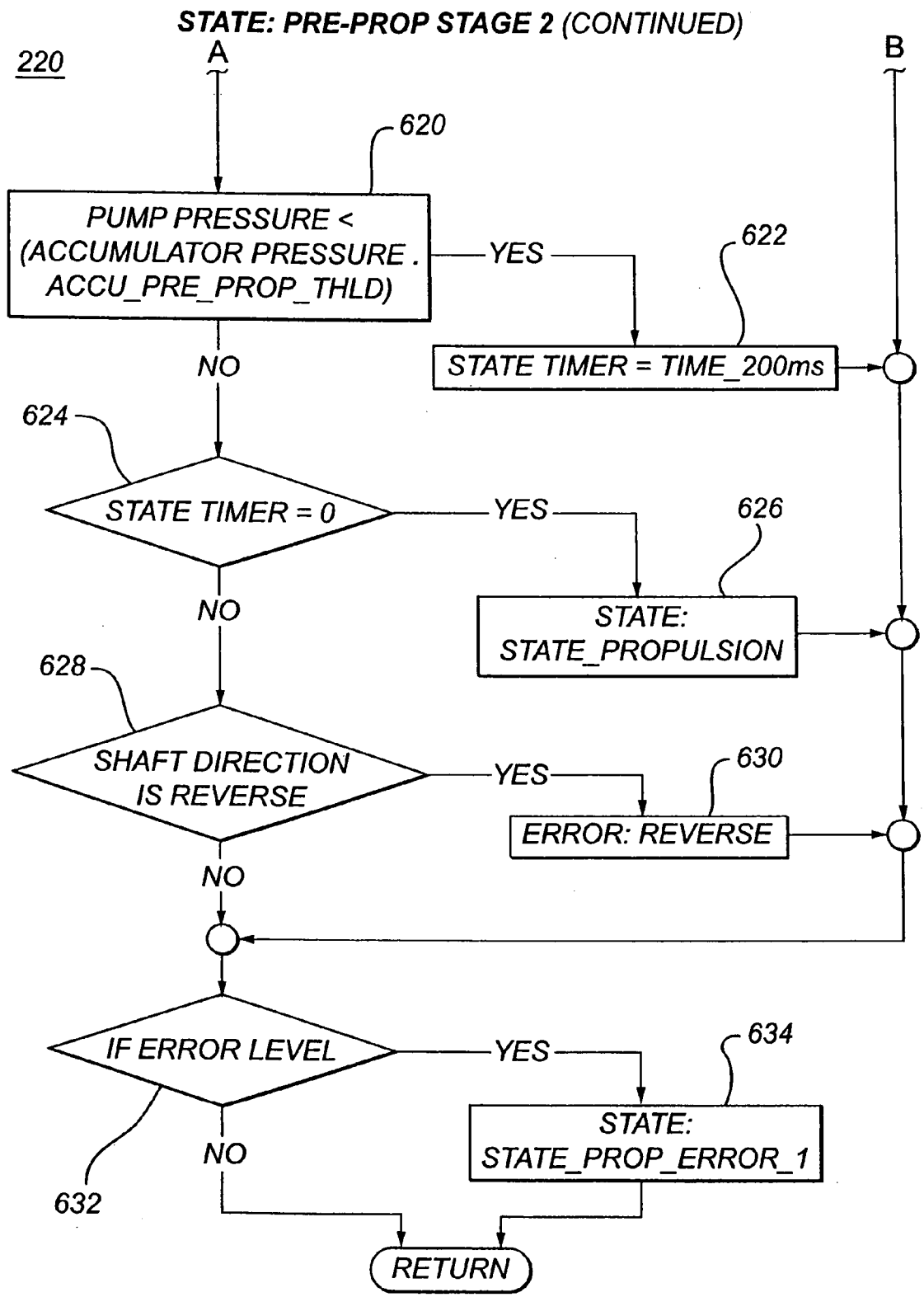

Referring then to FIG. 18, on entry into the Pre-Propulsion Stage 2 state 220 (step 590), all of the solenoids 72, 84, 100, 110 are switched on. The swash plate 61 is commanded to an angle relative to the drive shaft speed (step 602). The process ensures that the minimum load pressure is achieved even at very low drive shaft speeds (steps 594, 596, 598, 600). If it is the first time in this state, then a state timer is set to 200 ms (steps 604, 606). Up to one second (step 608) is allowed for the recovery according to the following checks: commanded angle remains above standby (step 612), drive shaft speed is higher than a threshold speed (step 616), accumulator capacity is higher than 10% (step 612), the pump/motor unit is still loaded (step 620), and the shaft is rotating in the forward direction (step 628). If all of these checks are satisfied, then the process proceeds to the Propulsion state 224 (step 626). Otherwise, the process proceeds Propulsion Error 1 state 226 (steps 614, 632, 634).

Propulsion Error 2 State

Figure 19:
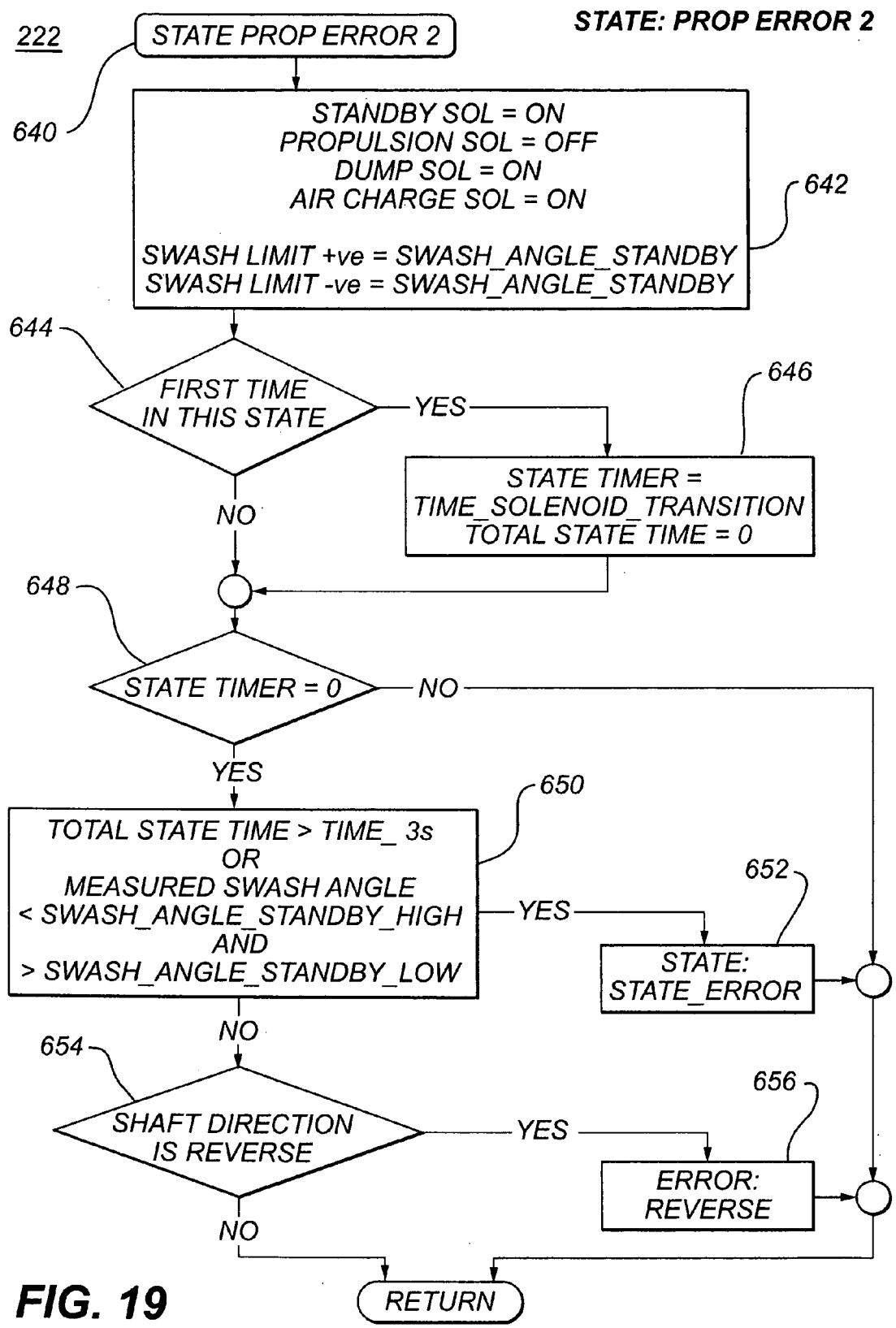

Referring then to FIG. 19, on entering the Propulsion Error 2 state 222 (step 640), the solenoids 72, 84, 100, 110 are set to loaded conditions and the swash plate 61 is commanded to the standby position (step 642). A minimum state timer is set to three seconds, thus allowing up to three seconds for the measured swash plate angle to move into the standby window (steps 644, 646, 648, 650). Once this has occurred, or the time has expired, the process proceeds unconditionally to the Error state 234 (step 652). If the drive shaft is rotating in the reverse direction, then a reverse error is flagged (steps 654, 656).

Propulsion State

Figure 20A:
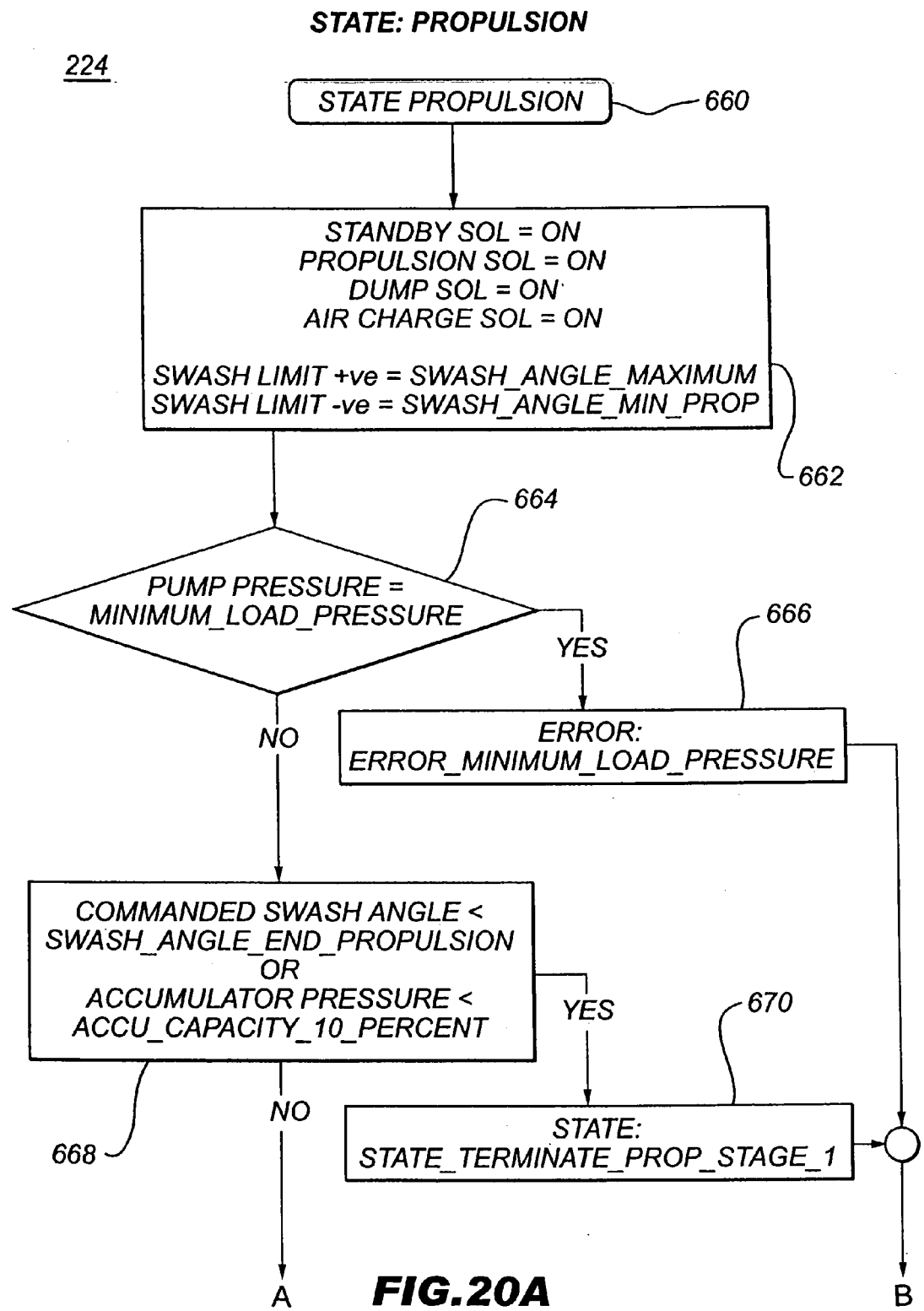
Figure 20B:
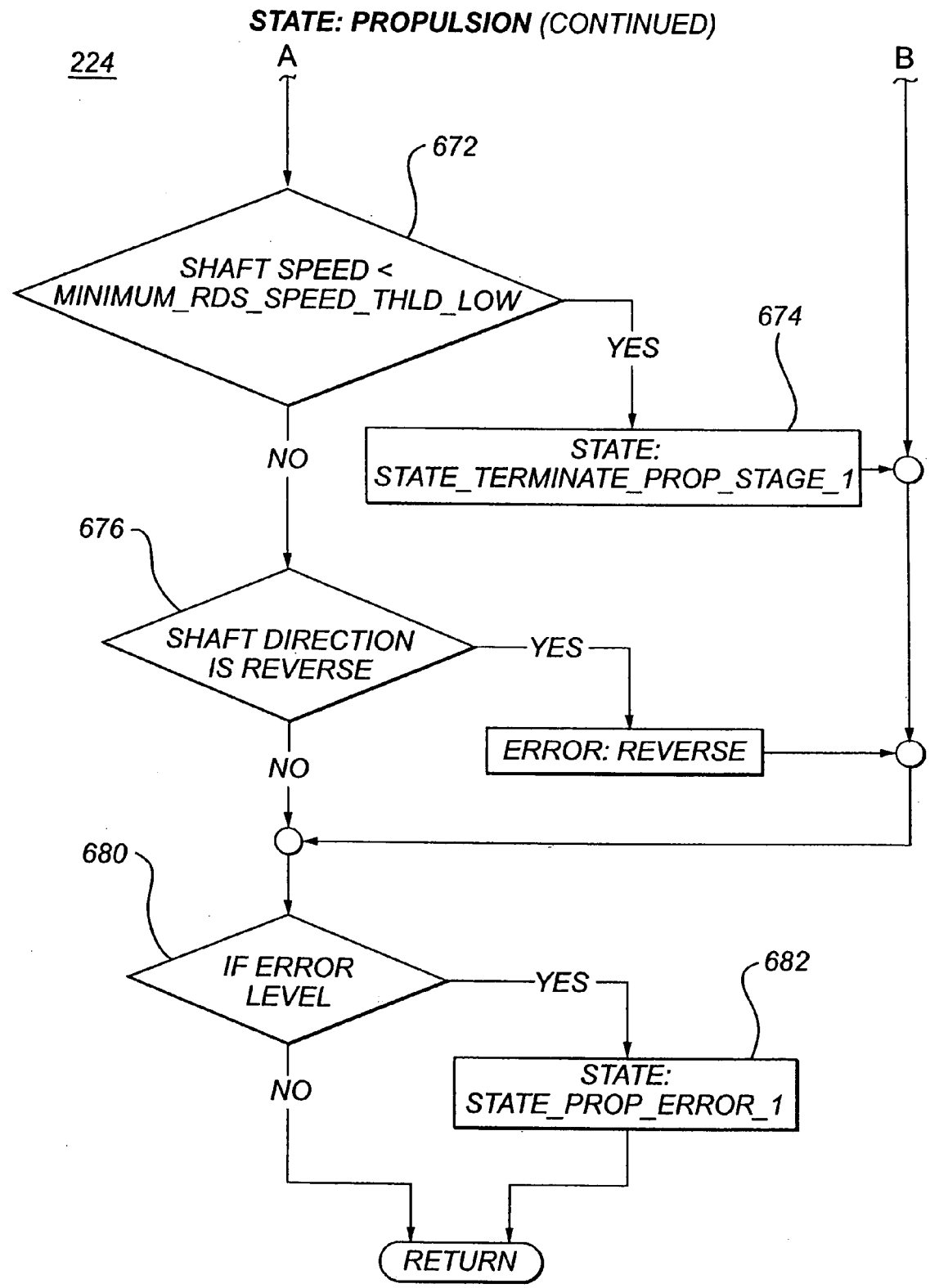

Referring then to FIG. 20, once the Propulsion state 224 is entered (step 660), all solenoids 72, 84, 100, 110 are switched on, and the swash plate 61 is allowed to move to the commanded propulsion angle (step 662). A series of propulsion checks are made: is the drive shaft speed above the minimum threshold speed (step 672), has the command not returned to the "standby" or is the accumulator capacity greater than 10% (step 668), is the pump/motor unit still loaded (step 664), and is the shaft still rotating in the forward direction (step 678). If any of these conditions are not satisfied, then the process will proceed to the Terminate Propulsion state 1 stage 228 (steps 670, 674). Any other errors cause the process to proceed to the Propulsion Error 1 stage 226 (steps 666, 678, 680, 682).

Propulsion Error 1 State

Figure 21:
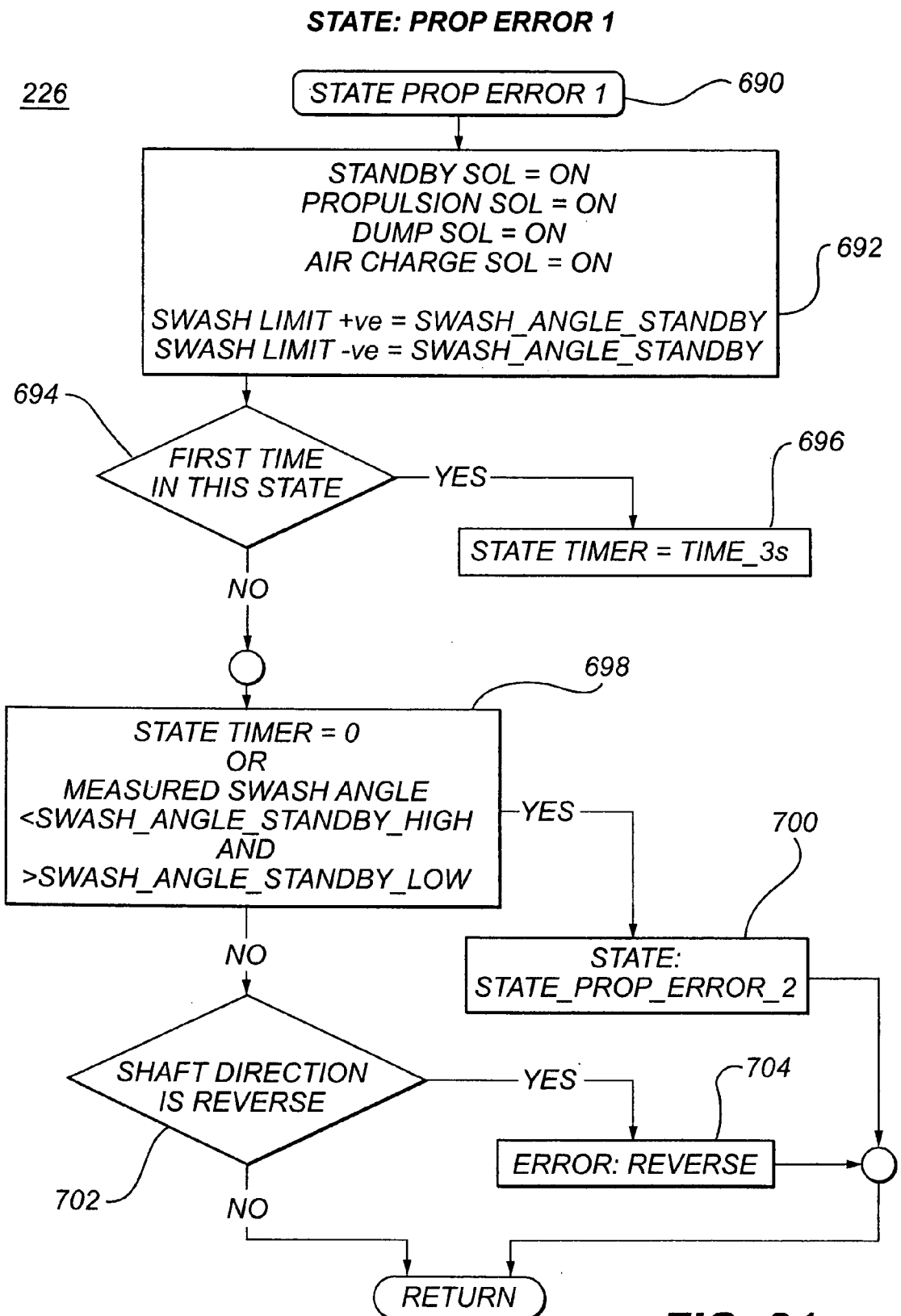

Referring then to FIG. 21, when the Propulsion Error 1 state 226 is entered (step 690), all the solenoids 72, 84, 100, 110 are switched on, and the swash plate 61 is commanded to the standby position (step 692). A minimum state timer is set to three seconds, allowing up to three seconds for the swash plate 61 to move into the standby window (steps 694, 696, 698). Once this has occurred, or the three second period expires, the process proceeds to Propulsion Error 2 state 222 (step 700), unconditionally. If the shaft is rotating in the reverse direction, then an error flag is raised (step 704).

Terminate Propulsion Stage 1 State

Figure 22A:
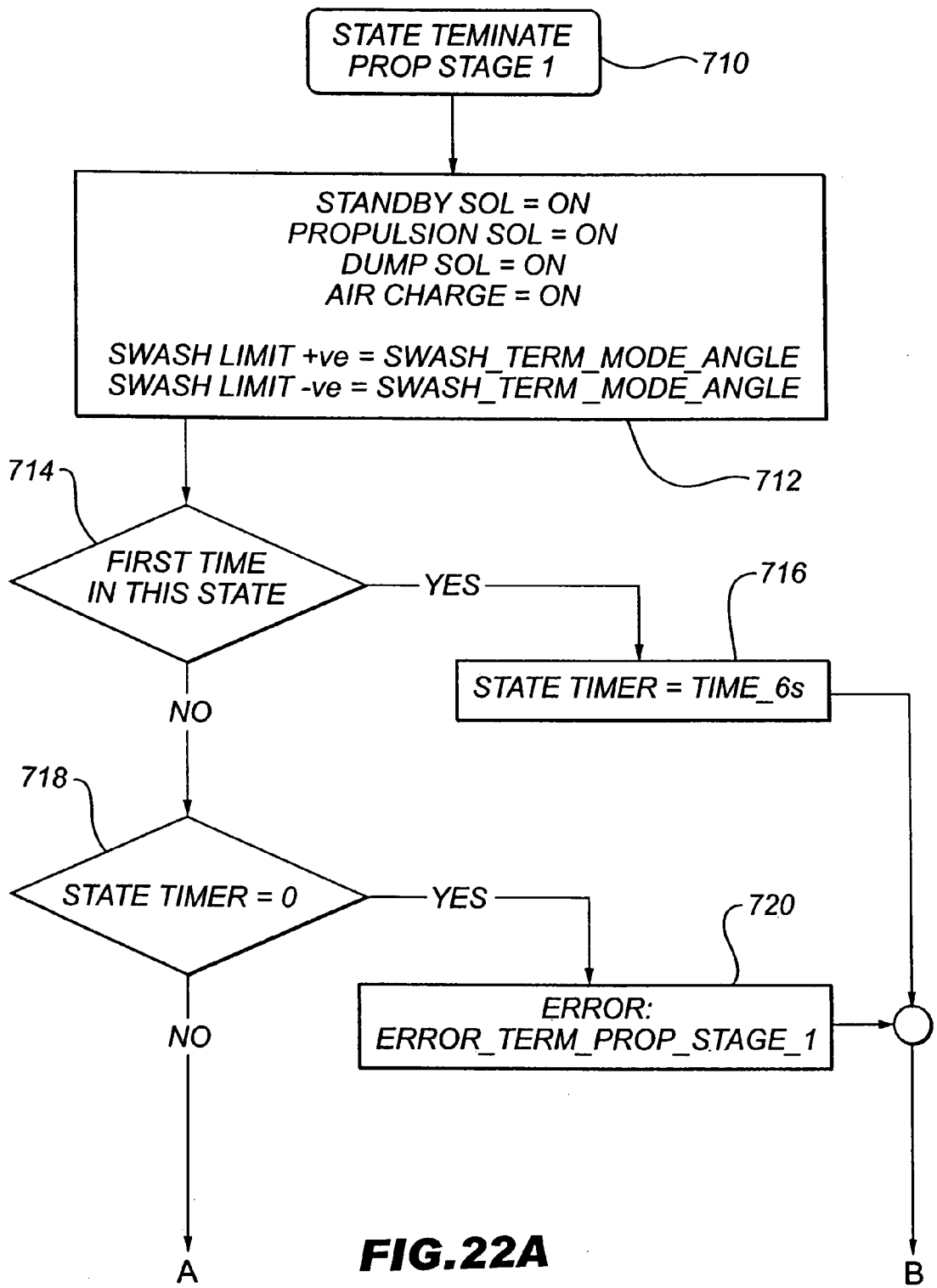
Figure 22B:
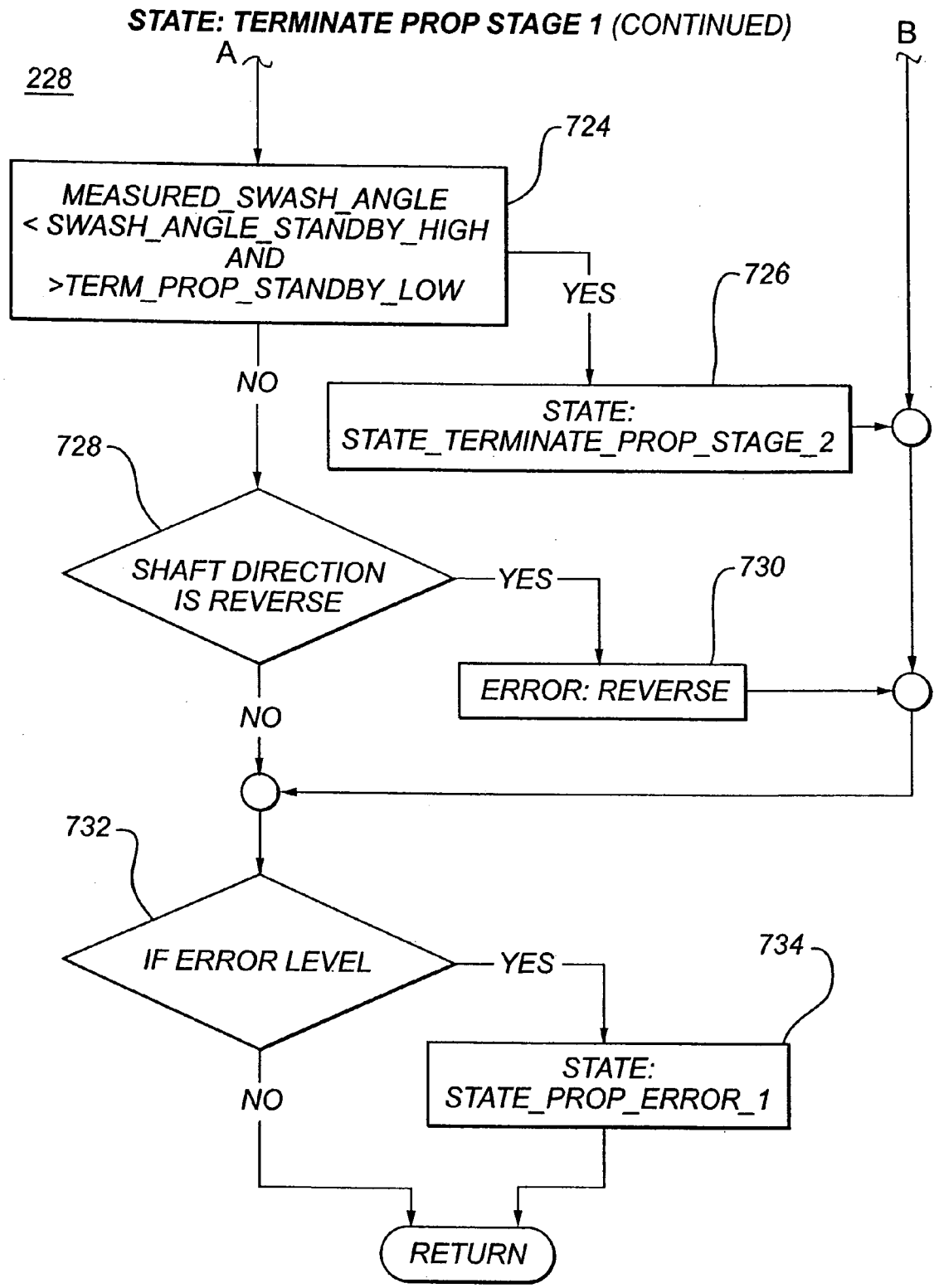

Referring then to FIG. 22, when the Terminate Propulsion Stage 1 state 228 is entered (step 710), all the solenoids 72, 84, 100, 110 will be activated, and the swash plate 61 is limited to the terminate mode angle value (step 714). A state timer is set to six seconds, allowing that period of time for the swash plate 61 to move into the standby window (steps 714, 716, 718, 724). If the swash plate 61 fails to move into the standby window within the six second period, then the process proceeds to the Propulsion Error 1 state 226 (step 720). If the condition is satisfied, however, the process proceeds to the Terminate Propulsion Stage 2 state 230 (step 726). Any other error, including shaft rotating in reverse, results in the process proceeding to the Propulsion Error 1 state 226 (steps 720, 728, 730, 732, 734).

Terminate Propulsion Stage 2 State

Figure 23:
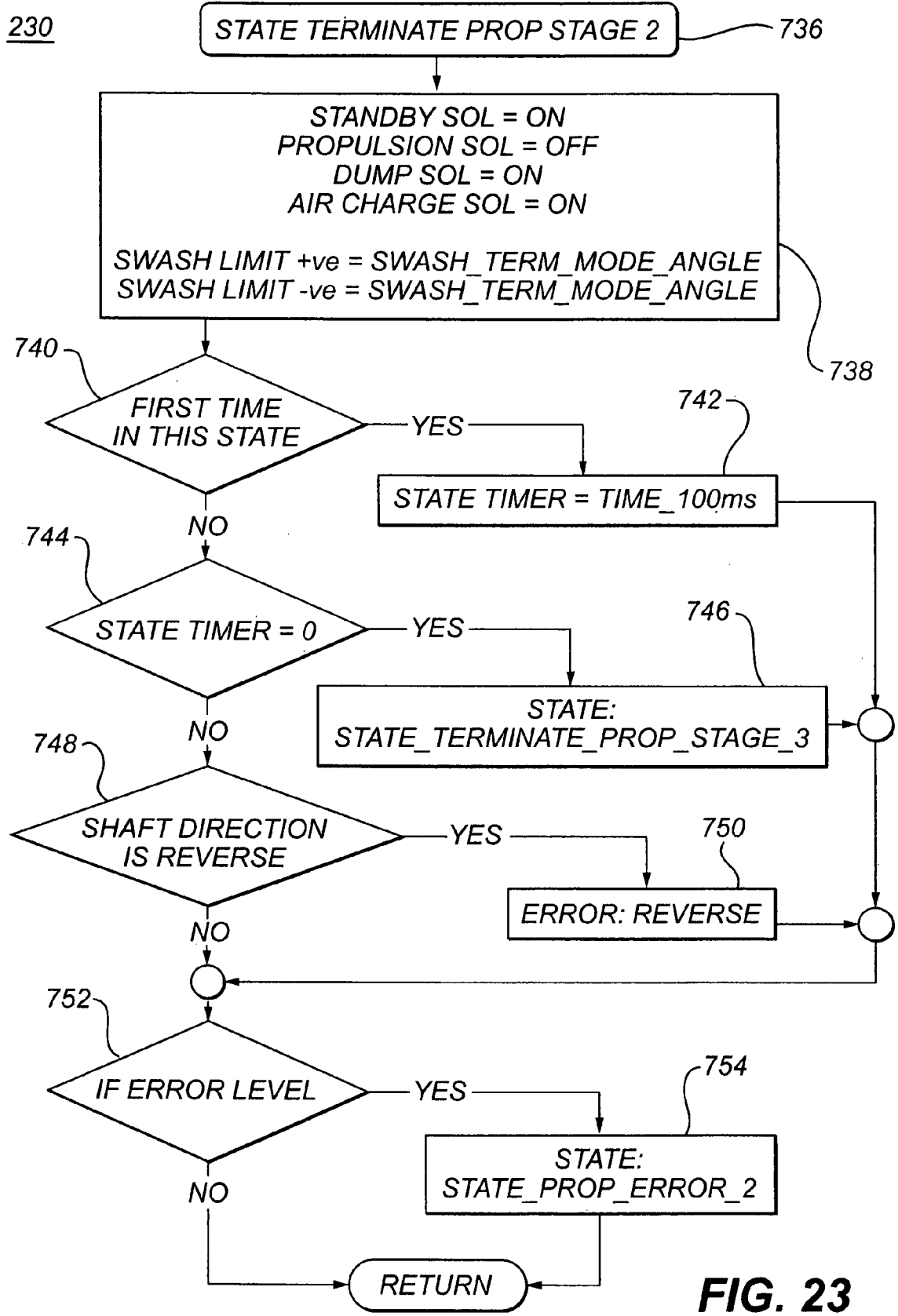

With reference to FIG. 23, when the Terminate Propulsion Stage 2 state 230 is entered (step 736), the propulsion solenoid 100 is deactivated, however the standby solenoid 72 remains activated, and the pump/motor unit 60 is still loaded (step 738). The swash plate 61 is commanded to the terminate mode angle (step 738 also) and a state timer is set to 100 ms (steps 740, 742). When the timer has decremented to 0 without any errors occurring (step 744), the process will proceed to the Terminate Propulsion Stage 3 state 232 (step 746). Any errors detected, including the drive shaft rotating in the reverse direction, will cause the process to proceed to the Propulsion Error 2 state 222 (steps 748, 750, 752, 754).

Terminate Propulsion Stage 3 State

Figure 24A:
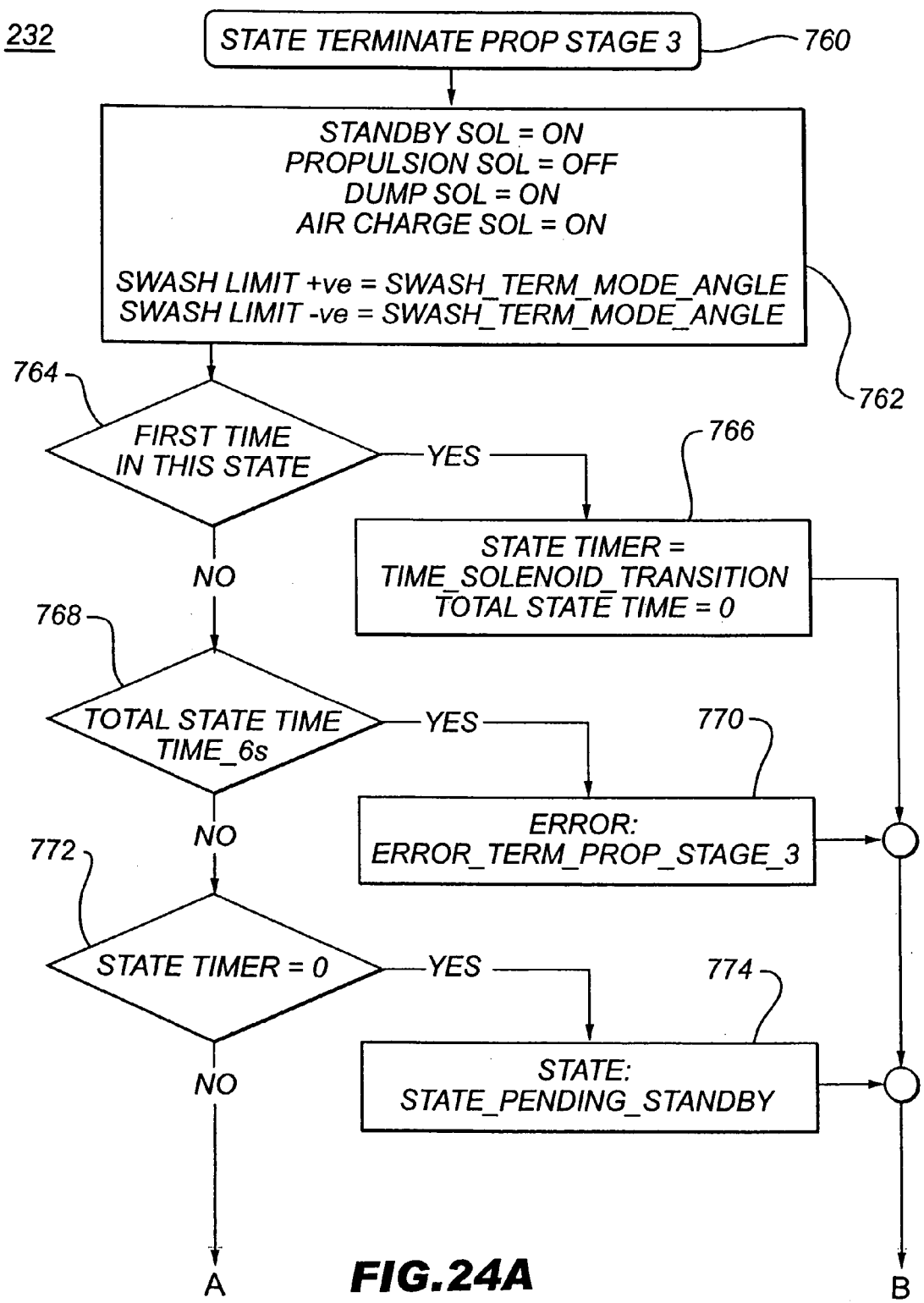
Figure 24B:
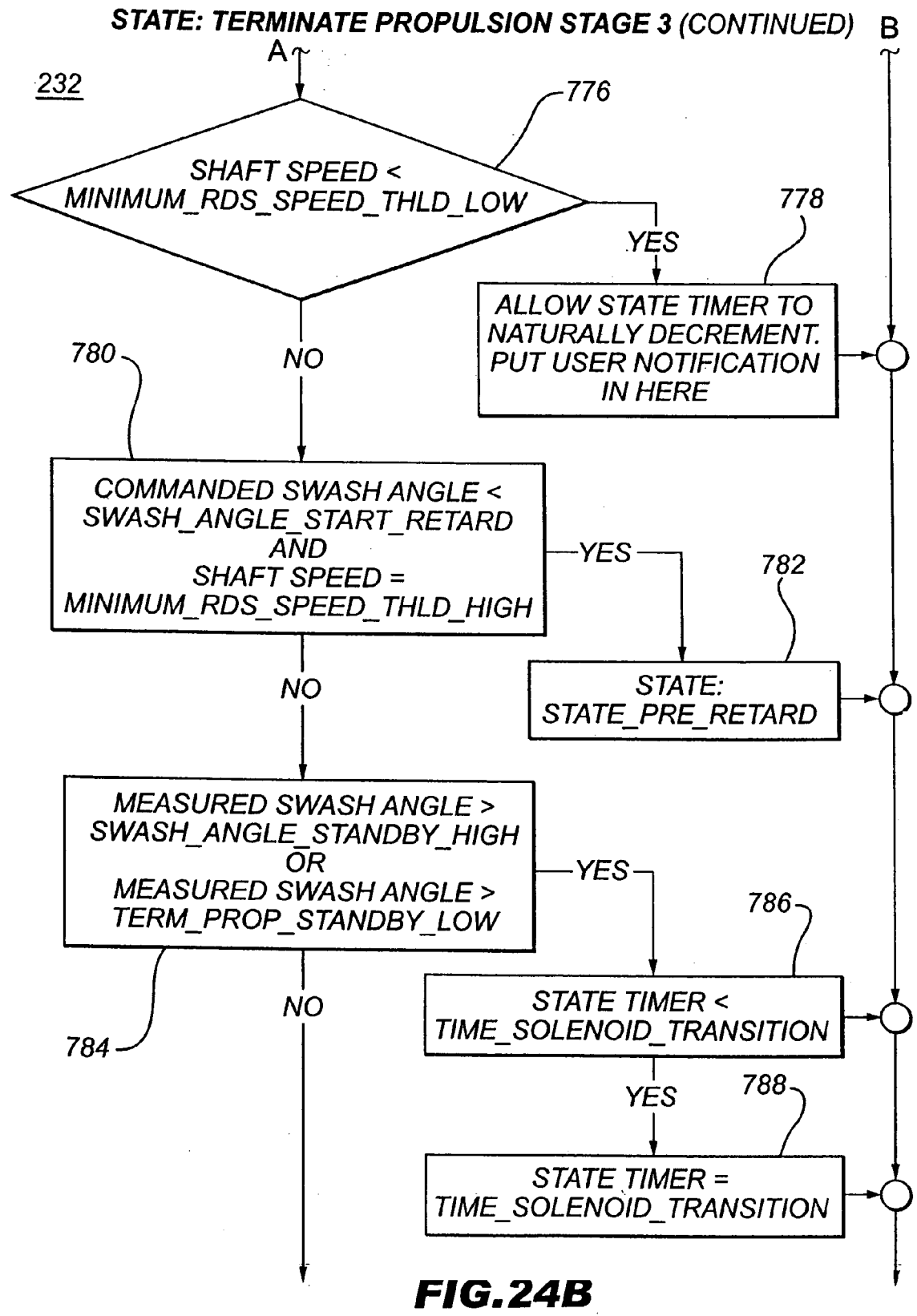
Figure 24C:
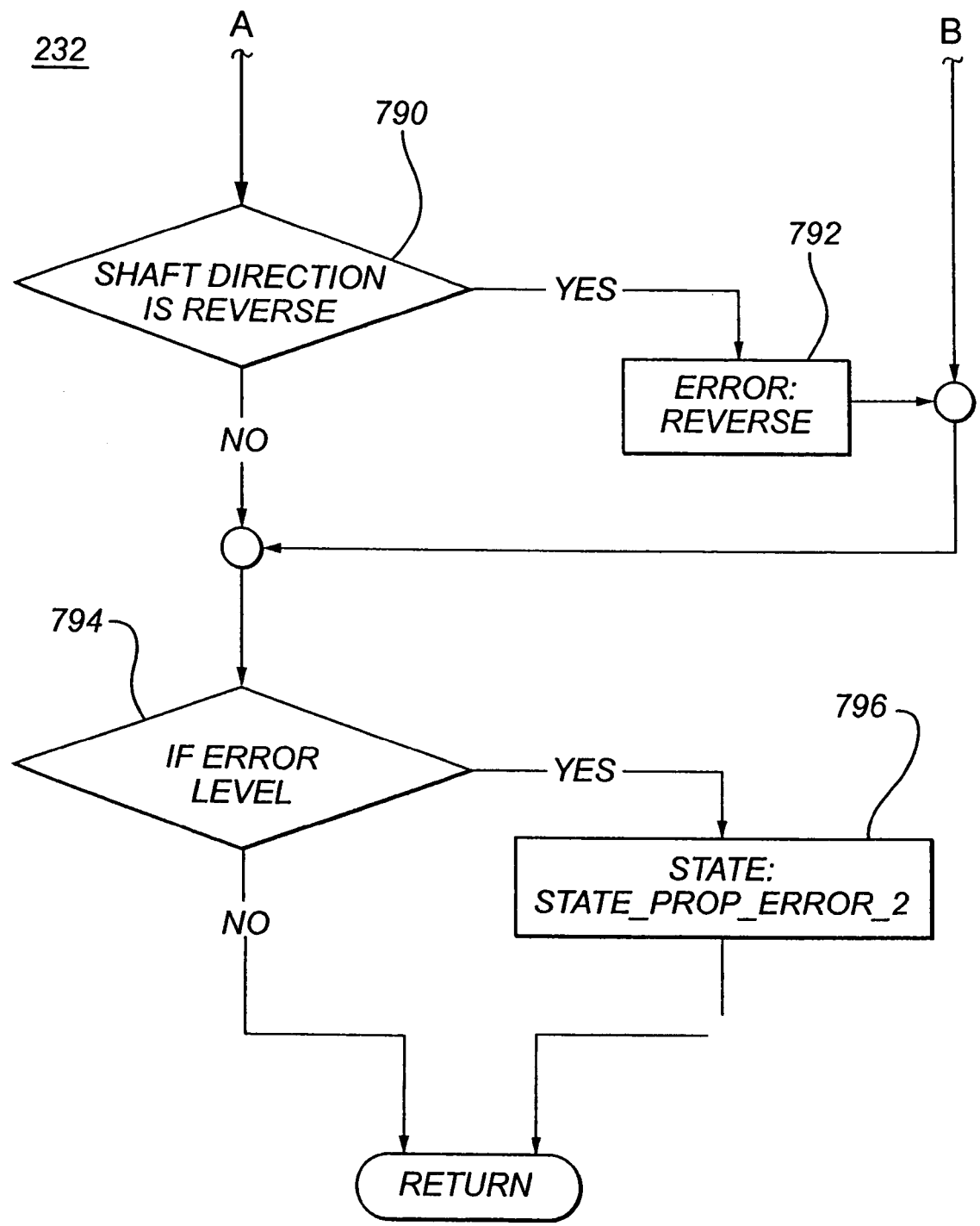

Referring then to FIG. 24, on entry into the Terminate Propulsion Stage 3 state 232 (step 760), the solenoids 72, 84, 100, 110 are set to loaded conditions, the pump/motor unit 60 will already be loaded, and the swash plate 61 is commanded to the terminate mode angle (step 762). A minimum state timer is set to six seconds. A check is made of whether the drive shaft speed is above a minimum threshold (step 776), then if the commanded mode has proceeded to Retard (step 780). If so, the process checks the drive shaft speed and that the minimum transition time has passed (steps 776, 786, 788). If these conditions are met, then the process proceeds to the Pre-retard state 210 (step 782). If the commanded mode has not changed, the process checks that the commanded state has returned to standby (step 780), and that the swash plate has moved to the standby position (step 784), by the elapse of time, and then proceeds to the Pending Standby state 204 (step 774). If none of the conditions are meeting within the period of six seconds or if any general or reverse drive shaft errors occur, then the process proceeds to the Propulsion Error 2 state 222 (steps 770, 790, 792, 794, 796).

Error State

Figure 25:
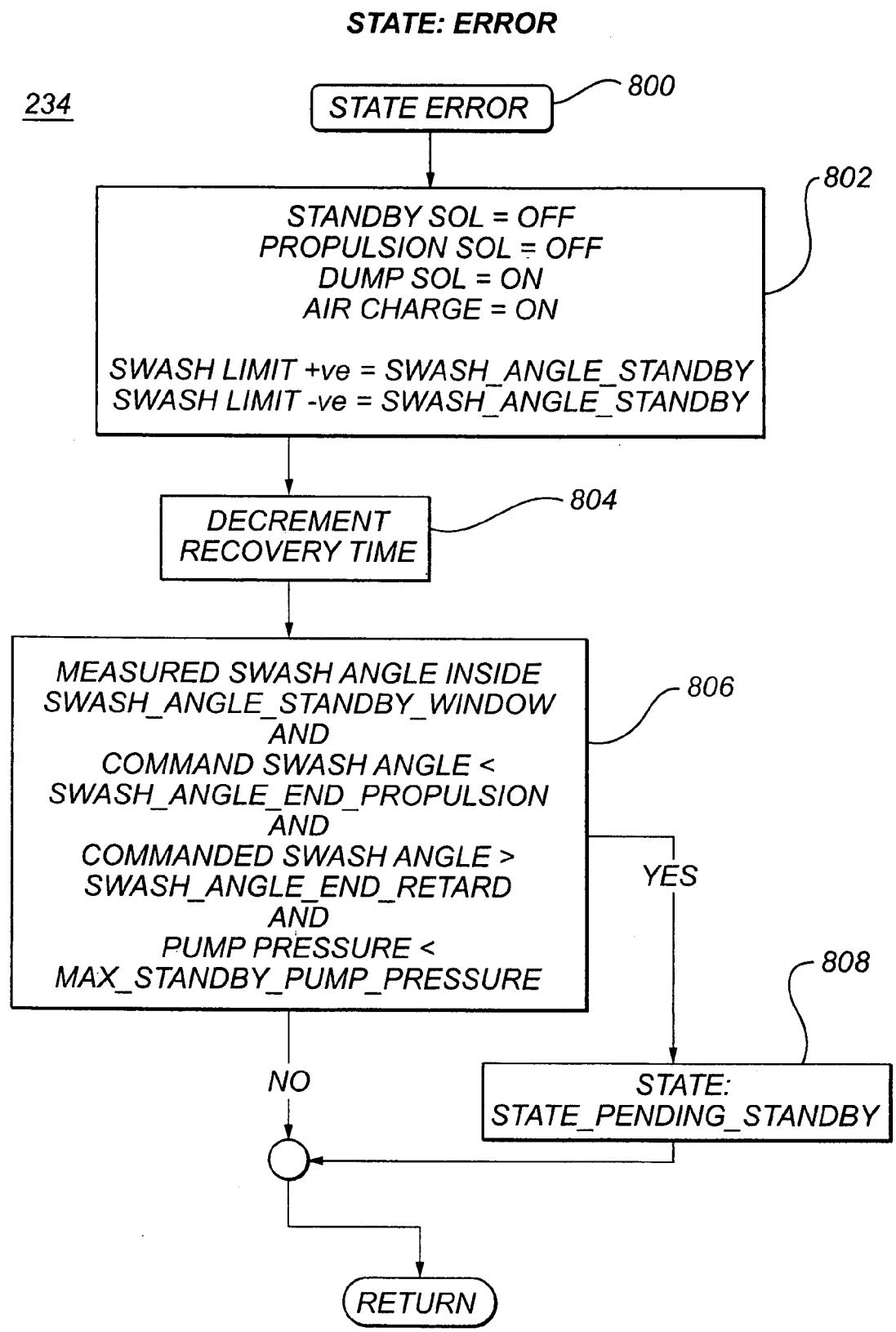

Referring then to FIG. 25, when the Error state 234 is entered (step 800) the solenoids 72, 84, 100, 110 are set to the Standby conditions and the swash plate 61 to the standby angle (step 802). The process then decrements a recovery time measure (step 804). The process is concerned with providing recovery times for errors and looking for swash plate and standby pressure stability (step 806), to move to the Pending Standby state 204 (step 808).

Disengaged State

The Disengaged state 236 is the default position for the clutch 52. The objective is to disengage the RDS 10 whenever possible, to avoid wear and slow drawing off of stored energy during Standby mode. It is required that both electric power and hydraulic pressure be present in order to move to the Pending Standby state 204.

Reverse State

Figure 26:
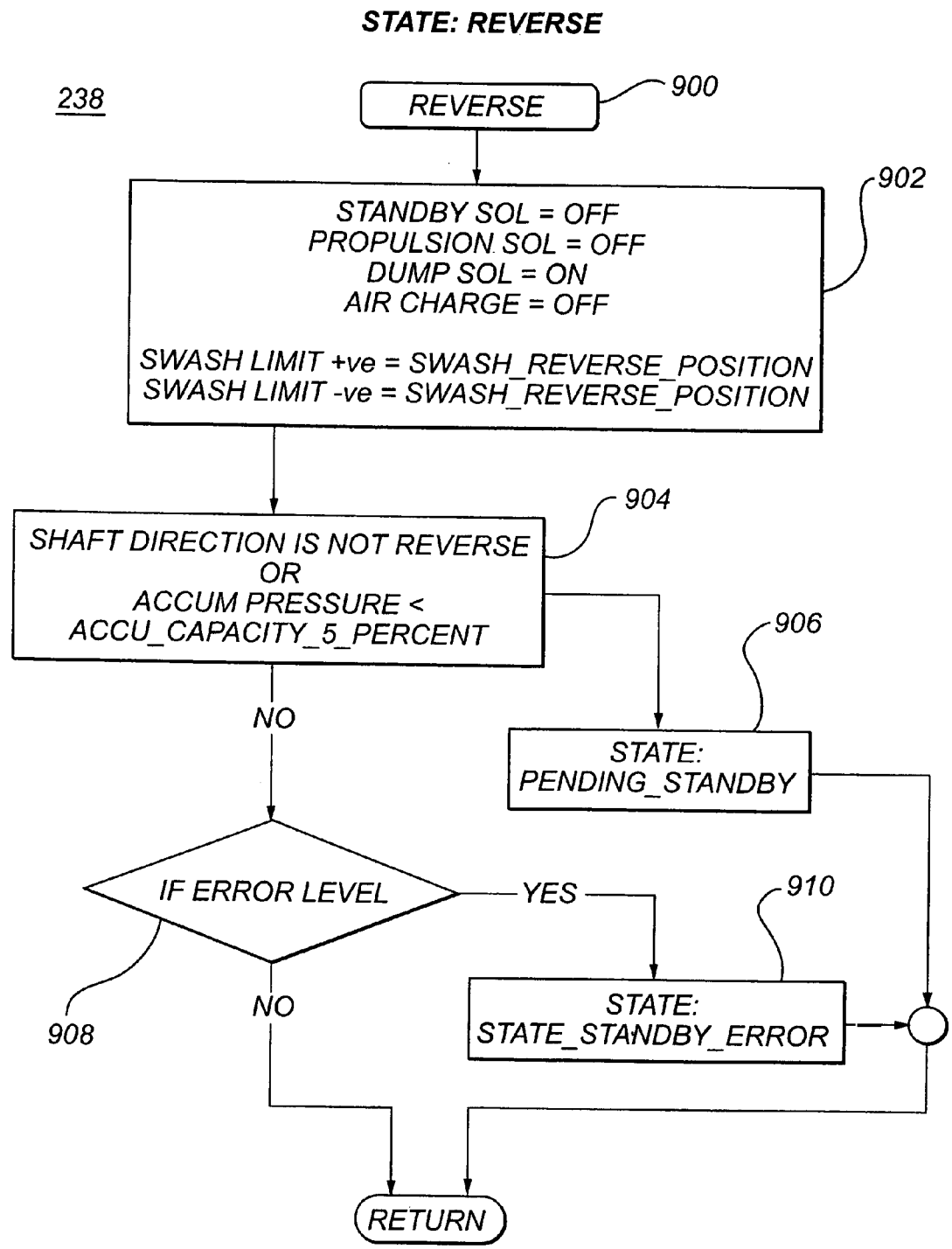

Referring then to FIG. 26, when the Reverse state 238 is entered (step 900), the solenoids 72, 84, 100, 110 are set to standby conditions and limits are placed on the swash plate actuated (step 902). If the drive shaft is detected rotating in the reverse direction, or if the accumulator has a capacity of less than 5% (step 904), then the process proceeds to the Pending Standby state 204 (step 906). Otherwise, the process proceeds to the Standby Error state 208 (steps 908, 910).

High-Level Strategy Control

The high-level control strategy and low-level control strategy, in a preferred embodiment, are implemented as separate computer programs that pass variables between each other, but otherwise act autonomously. The low-level control strategy has responsibility of ensuring safe operation of the RDS 10, in the form of absolute rules. The high-level control strategy also operates on rules concerned with safe vehicle operation. There thus is a two-tier approach to safe operation.

The high-level strategy control unit 28 received inputs from the vehicle throttle system 34, an engine speed sensor 38, and the drive shaft signal 29, the available torque signal 30 and the actual torque signal 32 as shown in FIG. 1. The principal control variable is throttle position.

Throttle

In some classes of vehicle, the throttle operation will provide that the first, say, 0-18% of throttle position is a form of engine braking (such as exhaust braking). The range of 20%-60% may represent constant speed of the vehicle, and it is only throttle positions in excess of 60% that represent vehicle acceleration. Of course, in other vehicles, any throttle position >0% may represent propulsion.

Propulsion Mode

As described previously, in the Propulsion mode the RDS 10 will be used as a source of energy for the vehicle 11.

The high-level strategy control unit 28 performs a conversion from a (input) 'nominal throttle' signal 35 to a (output) 'commanded torque' signal 26 and a (output) 'reduced/modified throttle' signal 37. This is expressed as 'torque split', being the relative contributions of the vehicle's engine 11 and the RDS 10.

There are two basic approaches/modes to torque splitting: 'fuel saving' mode and 'boost' mode.

Propulsion—Fuel Saving Mode

The approach of the fuel saving mode is to replace some portion of engine torque by the RDS 10 operating in Propulsion mode, and between the engine 11 and the RDS 10, providing the appropriate torque for the throttle setting selected by the driver.

One benefit of this mode (as the name suggests) is to save on the consumption of fuel by recovering and utilising the vehicle's kinetic energy. Any reduction in fuel usage has a concomitant reduction in greenhouse gas emissions.

Figure 27:
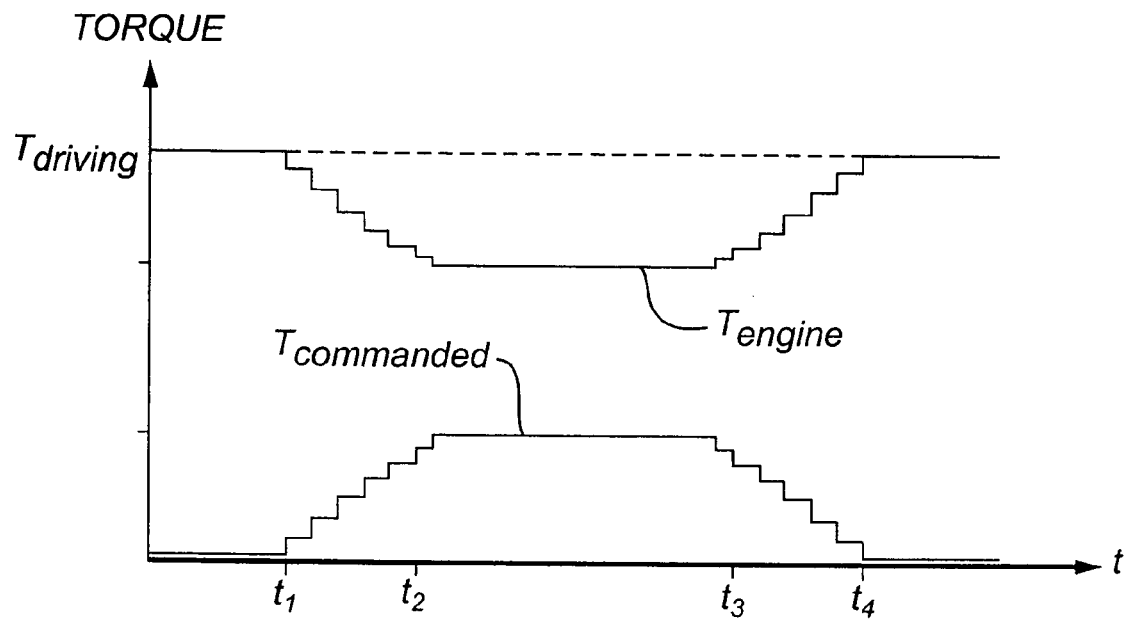
FIG. 27 shows a torque characteristic for a propulsion fuel saving mode of operation.

Referring now to FIG. 27, a torque splitting arrangement is shown. It is assumed a constant propulsion torque is to be imparted to the drive train 12. The value $T_{drive}$ is provided entirely by the engine in the period $0\text{-}t_1$. At time $t_1$, the RDS 10 moves from standby into propulsion mode, and steps to a constant commanded torque value $T_{comm}$. At the same time, the torque contributed by the engine 11 steps down such that the value $T_{drive}$ remains constant. In the period $t_2\text{-}t_3$, the engine 11 and the RDS 10 provide a respective constant torque contribution. In the period $t_3\text{-}t_4$, a similar stepping occurs such that from $t_4$ onwards, the only contribution is from the engine 11. Typically this represents the situation where the available torque signal 30 has reduced to or below 10% of full capacity. For all time periods, the relation: $T_{drive}=T_{engine}+T_{comm}=$constant, holds true, in this example. However, engine torque is never constant as a function of speed. Thus, $T_{engine}$ will rarely be able to be held constant in a propulsion event, meaning that the RDS 10 torque component will not be piecewise linear, but at all times attempting to maintain the driving torque to be constant.

Propulsion-Boost Mode

The basic idea behind the boost mode is to supplement engine torque to give an additional short term power capacity on propulsion, and to over-work an engine during retardation to—as quickly as possible—charge the accumulator 62 to be ready for the next propulsion event. In other words, the consumption of fuel is not a concern.

Figure 28:
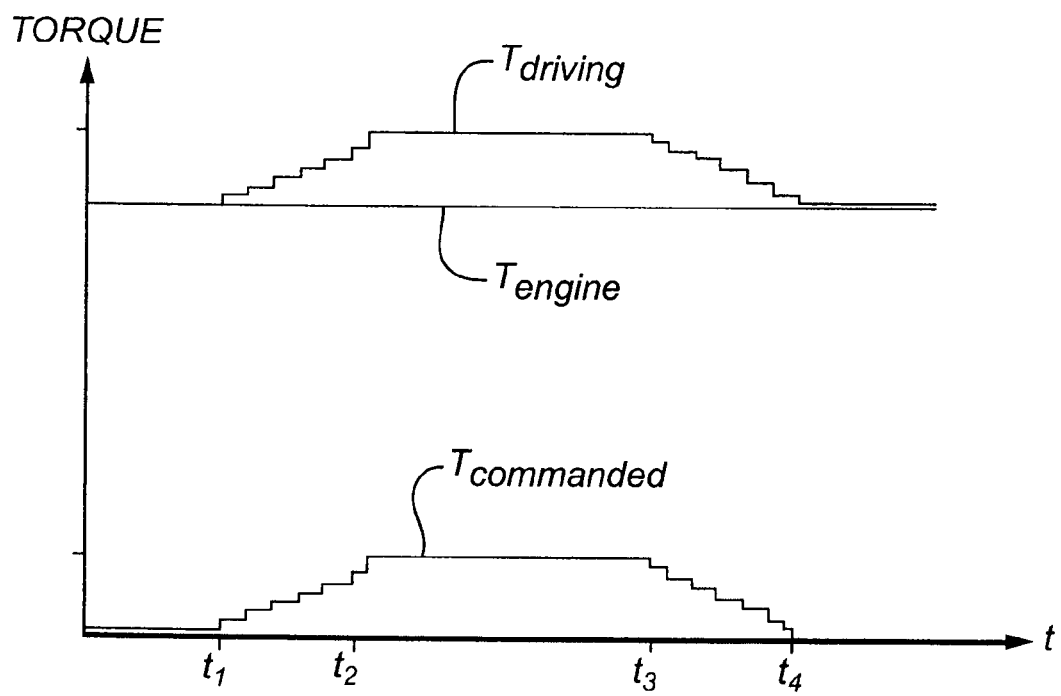
FIG. 28 shows a torque characteristic for a propulsion boost mode of operation.

FIG. 28 shows graphically the relation: $T_{drive}=T_{engine}+T_{comm}$, where, in the period $t_1\text{-}t_4$, the engine torque is supplemented by the RDS torque.

Throttle Modification

Figure 29:
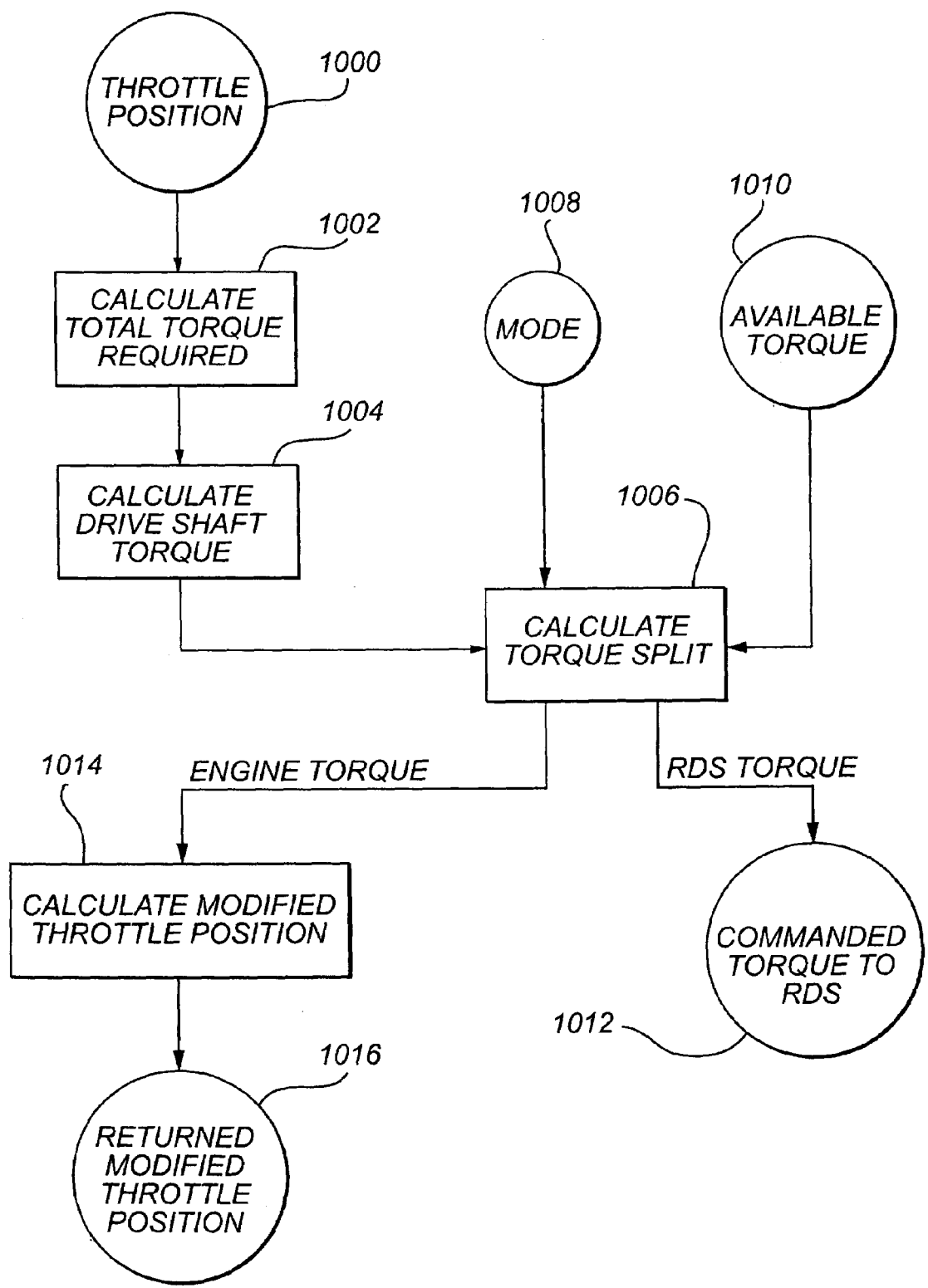
FIG. 29 is a flow diagram showing how throttle position is modified.
Figure 30:
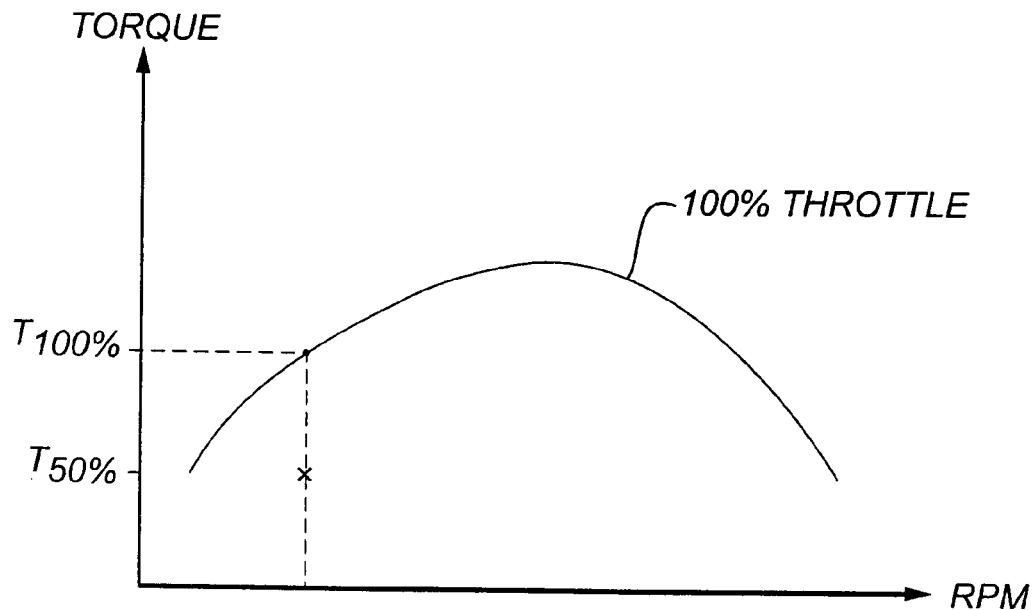
FIG. 30 shows a typical engine torque/speed characteristic.

Referring now to the flow diagram of FIG. 29, the vehicle's throttle position is continuously monitored (step 1000). A calculation is performed to give a driving torque value (step 1002). This process requires the engine speed signal 38. FIG. 30 shows a representative diagram of engine torque versus engine speed for a 100% throttle setting. The characteristic typically needs to be measured. It is assumed that there is a linear relationship between throttle position and torque for any given speed. Thus, for say, a 50% throttle position, then for the relevant engine speed, the nominal engine torque $T_{50\%}$ can be determined.

Figure 31:
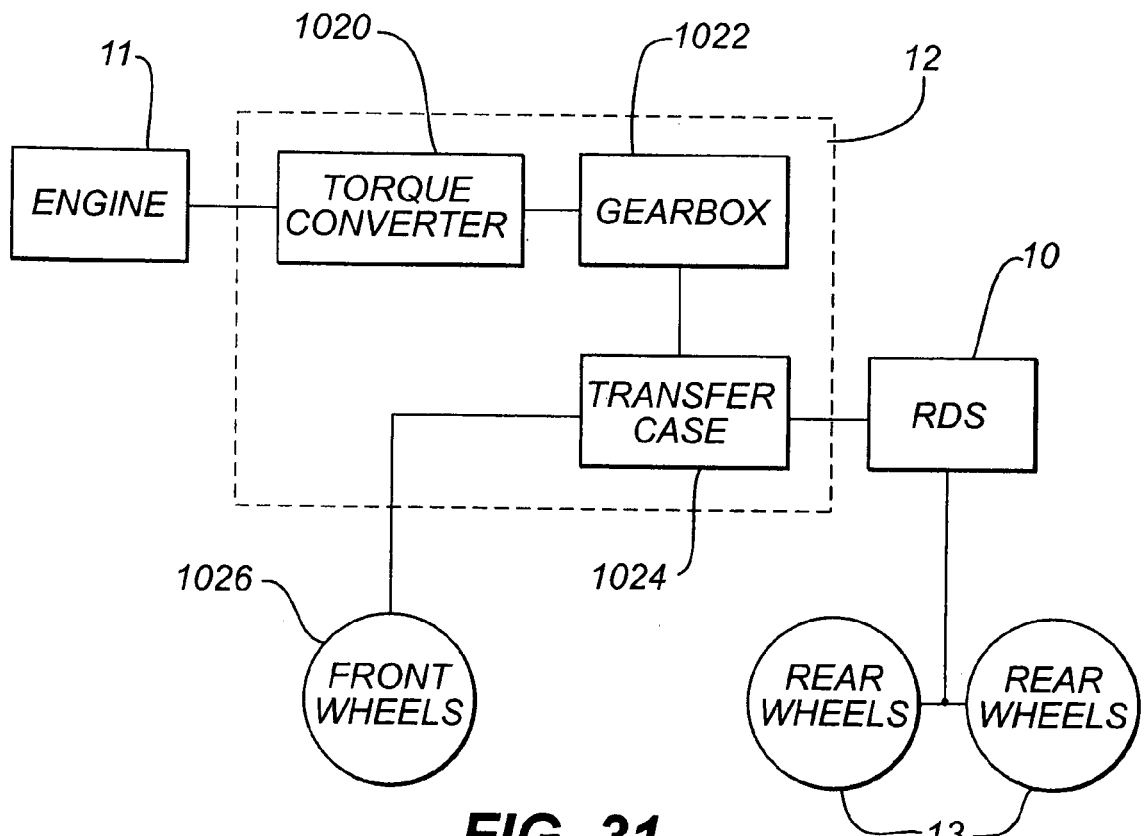
FIG. 31 is a schematic block diagram of a vehicle drive train.

The nominal engine torque is known, and needs to be referenced to a torque value at the drive shaft 50, where the RDS 10 acts (step 1004). Referring now to FIG. 31, a block diagram of the mechanical components of the drive train are shown. It is therefore necessary to mathematically model the torque as it passes a torque converter 1020, a gearbox 1022 and a transfer case 1024. Torque variously will be a function of speed, gear losses, torque split between front wheels 1026 and rear wheels 13, etc. The mathematical model can be developed based on measurements that provide data sets forming the basis of look-up tables.

Now that the torque at the drive shaft (equivalent to the throttle position) is known, the torque split is determined (step 1006). To do this, the operational mode is firstly read (step 1008). Assume for the purposes of the discussion that Fuel Saving mode is selected, meaning that a constant torque approach is adopted (see FIG. 28). The instantaneous available RDS torque 30 is read (step 1010), and a target torque (i.e. commanded) value is selected to be less than the available torque. The target torque value might typically be 65% of the available torque. The available torque will decrease over time for any propulsion event, and it may be necessary to reduce the target torque to track the reducing available torque.

The (time variant) commanded/target torque value 26 thus is provided to the low-level strategy control unit 14 (step 1012). The corresponding engine torque component must be converted back to a modified throttle position (step 1014), following a reverse process according to the drive train model as discussed above. The thus-derived modified throttle position 37 is returned to the throttle system 34 (step 1016).

There will be situations where there is a form of throttle-related engine braking, meaning that only a partial range of throttle position represents propulsion. In such a case an appropriate offset will need to be provided to ensure the RDS mode of operation matches that intended by the driver operating the throttle.

The high-level strategy control unit 28 implements a PID control algorithm that uses the actual torque signal 32 as a feedback variable to be compared with the commanded torque value 26.

Retard—Fuel Saving Mode of Operation

During retard, the objective is to absorb drive shaft torque at a constant level to give a constant deceleration, and to charge the accumulator 62 to a full condition within a time period characteristic of a deceleration episode.

Figure 32:
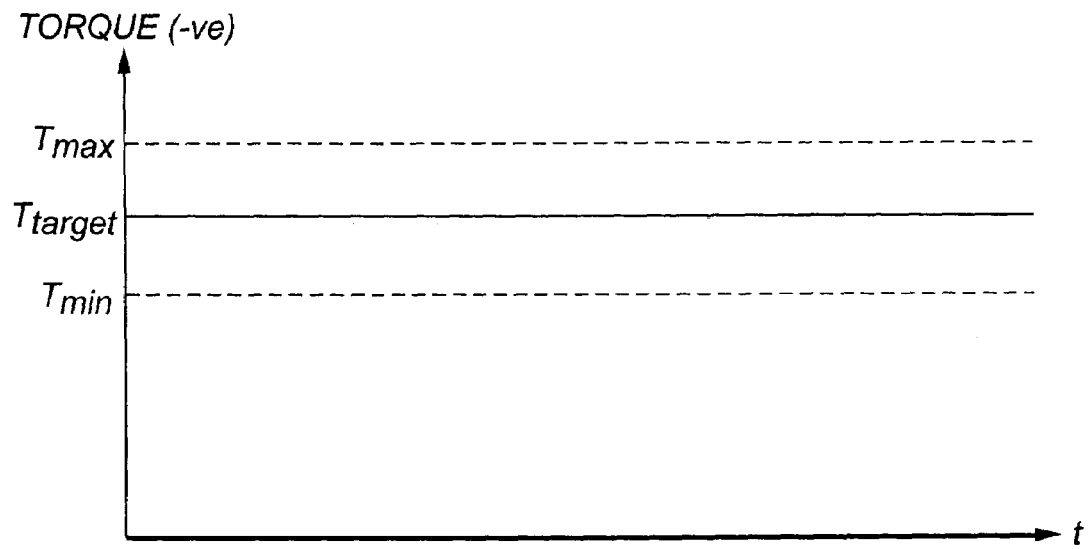
FIG. 32 shows a torque characteristic for a retard fuel saving mode of operation.
Figure 33:
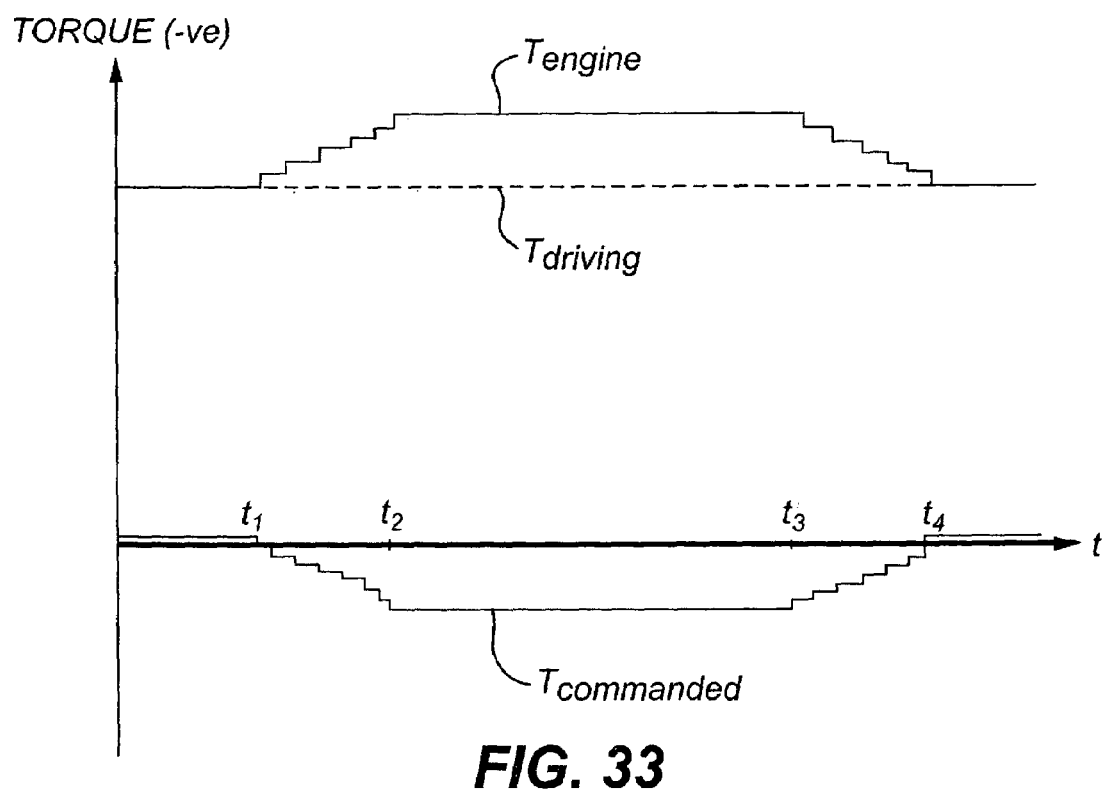
FIG. 33 shows a torque characteristic for a retard dash mode of operation.

FIG. 32 shows the RDS torque characteristic in a retard mode of operation. The high-level strategy control unit 28 seeks to draw-off energy from the drive train at a constant torque. The commanded target torque value, $T_{target}$, is maintained to be within a range bounded by maximum and minimum values, $T_{max}$, $T_{min}$. The real-time value of $T_{target}$ as a function of throttle position is determined empirically, in consideration of giving the driver a natural 'feel' of deceleration. $T_{max}$ will be set to achieve a maximum braking effect, typically 0.15 g.

Retard—Boost Mode

FIG. 34 graphically shows the same relationship $T_{drive}=T_{engine}+T_{comm}=$constant. In other words, the driving (retarding) torque remains constant, and the recharging of the accumulator 62 occurs by the engine working harder during the period $t_1\text{-}t_4$.

Throttle Modification

During Retard mode operation, there is no need to be concerned with engine throttle setting, save where engine braking is provided, in which case the target retard torque may be adjusted to ensure a constant deceleration to account for the engine braking contribution. Once, again, a PID feedback control algorithm will be used to control the target retard torque against the actual torque 32.

Transmission Considerations

The foregoing description contemplates a vehicle having an automatic transmission. Of course, many vehicles will have manual transmissions, which means the throttle and vehicle clutch pedals are constantly operated. It is thus necessary to discriminate a clutching event over a braking/deceleration event. This can be done by detecting near-simultaneous operation of the clutch pedal and reduction in throttle (typically to a zero setting), so that the RDS 10 might continue in its current mode regardless of a clutching event taking place.

We claim:

1. A hydraulic regenerative drive system for a vehicle comprising:

an electronic controller receiving a nominal engine throttle signal, generating a time-variant torque signal therefrom, and outputting a modified engine throttle signal, and wherein said torque signal and the vehicle's engine torque corresponding to the modified throttle signal are equal to the torque corresponding to the nominal engine throttle signal;

a hydraulic control circuit receiving controlling signals from the electronic controller;

a reservoir in fluid communication with said hydraulic control circuit for storing hydraulic fluid;

a pump/motor unit having a controlled-angle swash plate element providing variable displacement said pump/motor unit being in fluid communication with said hydraulic control circuit and adapted for connection to the drive train of a vehicle;

an accumulator in fluid communication with said hydraulic control circuit;

a pump/motor unit speed sensor and a pump/motor unit pressure sensor providing measured speed and measured pressure signals to the electronic controller;

wherein said electronic control further generates said torque signal and said modified engine throttle signal on the basis of a mathematical model of drive train elements between the engine of said vehicle and said drive train connection-point of said pump/motor unit, converts said torque signal to a swash plate angle, and controls (i) a controlled-torque retard mode of operation, in which said swash plate angle is controlled by said torque signal to impart a dynamically calculated retarding torque to said drive train, and said pump/motor unit pumps fluid from said reservoir to said accumulator via said hydraulic control circuit, and (ii) a controlled-torque propulsion mode of operation, in which said swash plate angle is controlled by said torque signal to impart a dynamically calculated propelling torque to said drive train, and said pump/motor unit motors under influence of fluid from said accumulator passing to said reservoir via said hydraulic control circuit; and wherein said electronic controller performs said conversion between said torque signal and swash plate angle on the basis of searching predetermined characteristics of torque versus pressure versus speed for a set of swash plate angles to locate one or more closest torque values for the predetermined pressure and speed closest to the measured pump/motor unit pressure and pump/motor unit speed, and deriving a swash plate angle from the angle values corresponding to said closest torque values.

2. The system according to claim 1, wherein said electronic controller further controls a standby mode of operation in which said pump/motor unit neither pumps nor drives, and further wherein said electronic controller enables said retard mode to occur only as a transition from said standby state, and enables said propulsion mode to occur only as a transition from said standby state.

3. The system according to claim 2, wherein said electronic controller further controls transition states between said modes, including:

a pre-propulsion state between standby mode an propulsion mode in which said controller determines that said pump/motor unit pressure exceeds a threshold value before causing said propulsion mode to occur; and a pre-retard state between standby mode and retard mode in which said controller determines that said pump/motor unit pressure is lower than a threshold value before causing said retard mode to occur.

4. The system according to claim 3, wherein said transition states further include:

a terminate propulsion state between propulsion mode and standby mode;

a terminate retard state between retard mode and standby mode;

and wherein said electronic controller further determines in said transition states that respective elements of said hydraulic control circuit have correctly changed condition in response to said controlling signals before causing a respective mode to occur.

* * * * *